United States Patent
Ganetakos et al.

(10) Patent No.: US 8,719,730 B2
(45) Date of Patent: May 6, 2014

(54) RADIAL USER INTERFACE AND SYSTEM FOR A VIRTUAL WORLD GAME

(75) Inventors: Joseph Benjamin Ganetakos, Toronto (CA); Frank James Caron, Mississauga (CA); Jesse Daniel Scoble, Toronto (CA); Gord Scott McLeod, Georgetown (CA); John Alexander Larsen, Toronto (CA); Felix Leung, Toronto (CA); Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 181 days.

(21) Appl. No.: 13/091,497

(22) Filed: Apr. 21, 2011

(65) Prior Publication Data
US 2011/0265041 A1    Oct. 27, 2011

Related U.S. Application Data

(60) Provisional application No. 61/327,346, filed on Apr. 23, 2010.

(51) Int. Cl.
*G06F 3/0482* (2013.01)

(52) U.S. Cl.
USPC .............................. 715/834; 715/757; 463/30

(58) Field of Classification Search
CPC ... G06F 3/04815; G06F 3/011; G06F 3/0482; G06F 3/04883; A63F 13/12
USPC .................................. 715/757, 834
See application file for complete search history.

(56) References Cited

U.S. PATENT DOCUMENTS

| | | |
|---|---|---|
| 5,717,869 A | 2/1998 | Moran et al. |
| 5,768,382 A | 6/1998 | Schneier et al. |
| 5,802,296 A | 9/1998 | Morse et al. |
| 5,880,731 A | 3/1999 | Liles et al. |
| 5,886,697 A | 3/1999 | Naughton et al. |
| 5,907,831 A | 5/1999 | Lotvin et al. |
| 5,971,855 A | 10/1999 | Ng |
| 6,022,273 A | 2/2000 | Gabai et al. |
| 6,031,549 A | 2/2000 | Hayes-Roth |
| 6,173,267 B1 | 1/2001 | Cairns |
| 6,210,272 B1 | 4/2001 | Brown |
| 6,219,045 B1 | 4/2001 | Leahy et al. |
| 6,267,672 B1 | 7/2001 | Vance |
| 6,273,815 B1 | 8/2001 | Stuckman |
| 6,388,665 B1 | 5/2002 | Linnett et al. |
| 6,404,438 B1 | 6/2002 | Hatlelid et al. |
| 6,435,875 B1 | 8/2002 | Karussi |

(Continued)

FOREIGN PATENT DOCUMENTS

| | | |
|---|---|---|
| GB | 2365364 | 2/2002 |
| JP | 2002063092 | 2/2002 |

(Continued)

OTHER PUBLICATIONS

BioWare Corp, "NeverWinter Nights Platinum", 2004.*

(Continued)

*Primary Examiner* — Tuyetlien Tran
(74) *Attorney, Agent, or Firm* — Pearne & Gordon LLP

(57) ABSTRACT

A user interface for a virtual world includes a circular area forming a display for an item in the virtual world, and controls surrounding only a portion of the display for controlling that item.

9 Claims, 18 Drawing Sheets

(56) References Cited

U.S. PATENT DOCUMENTS

| | | |
|---|---|---|
| 6,476,830 B1 | 11/2002 | Farmer et al. |
| 6,522,333 B1 | 2/2003 | Hatlelid et al. |
| 6,663,105 B1 | 12/2003 | Sullivan et al. |
| 6,677,968 B1 | 1/2004 | Appelman |
| 6,729,884 B1 | 5/2004 | Kelton et al. |
| 6,758,746 B1 | 7/2004 | Hunter et al. |
| 6,773,325 B1 | 8/2004 | Mawle et al. |
| 6,832,955 B2 | 12/2004 | Yokoi |
| 6,845,486 B2 | 1/2005 | Yamada et al. |
| 6,890,179 B2 | 5/2005 | Rogan et al. |
| 6,910,186 B2 | 6/2005 | Kim |
| 6,951,516 B1 | 10/2005 | Eguchi et al. |
| 6,954,728 B1 | 10/2005 | Kusumoto et al. |
| 7,012,602 B2 | 3/2006 | Watson et al. |
| 7,032,187 B2* | 4/2006 | Keely et al. .................. 715/863 |
| 7,054,831 B2 | 5/2006 | Koenig |
| 7,058,897 B2 | 6/2006 | Matsuda |
| 7,061,493 B1 | 6/2006 | Cook et al. |
| 7,062,722 B1 | 6/2006 | Carlin et al. |
| 7,086,005 B1 | 8/2006 | Matsuda |
| 7,139,796 B2 | 11/2006 | Rekimoto et al. |
| 7,168,051 B2 | 1/2007 | Robinson et al. |
| 7,210,104 B2 | 4/2007 | Nakagawa |
| 7,249,139 B2 | 7/2007 | Chuah et al. |
| 7,314,407 B1 | 1/2008 | Pearson |
| 7,342,587 B2 | 3/2008 | Danzig et al. |
| 7,396,281 B2 | 7/2008 | Mendelsohn et al. |
| 7,425,169 B2 | 9/2008 | Ganz |
| 7,442,108 B2 | 10/2008 | Ganz |
| 7,465,212 B2 | 12/2008 | Ganz |
| 7,493,558 B2 | 2/2009 | Leahy et al. |
| 7,534,157 B2 | 5/2009 | Ganz |
| 7,568,964 B2 | 8/2009 | Ganz |
| 7,587,338 B2 | 9/2009 | Owa |
| 7,604,525 B2 | 10/2009 | Ganz |
| 7,618,303 B2 | 11/2009 | Ganz |
| 7,677,948 B2 | 3/2010 | Ganz |
| 7,789,726 B2 | 9/2010 | Ganz |
| 7,823,074 B2 | 10/2010 | Takemura et al. |
| 7,846,004 B2 | 12/2010 | Ganz |
| 7,862,428 B2 | 1/2011 | Borge |
| 2002/0007313 A1 | 1/2002 | Mai et al. |
| 2002/0054094 A1 | 5/2002 | Matsuda |
| 2002/0090985 A1 | 7/2002 | Tochner et al. |
| 2002/0119810 A1 | 8/2002 | Takatsuka et al. |
| 2002/0130894 A1 | 9/2002 | Young |
| 2002/0147640 A1 | 10/2002 | Daniele |
| 2002/0169668 A1 | 11/2002 | Bank et al. |
| 2003/0018523 A1 | 1/2003 | Rappaport |
| 2003/0065721 A1 | 4/2003 | Roskind |
| 2004/0030595 A1 | 2/2004 | Park et al. |
| 2004/0043806 A1 | 3/2004 | Kirby |
| 2004/0093266 A1 | 5/2004 | Dohring |
| 2004/0189702 A1 | 9/2004 | Hlavac et al. |
| 2004/0221243 A1* | 11/2004 | Twerdahl et al. ............. 715/834 |
| 2004/0242326 A1 | 12/2004 | Fujisawa |
| 2005/0043076 A1 | 2/2005 | Lin |
| 2005/0059483 A1 | 3/2005 | Borge |
| 2005/0177428 A1 | 8/2005 | Ganz |
| 2005/0222906 A1 | 10/2005 | Chen |
| 2005/0229116 A1* | 10/2005 | Endler et al. .................. 715/862 |
| 2005/0250415 A1 | 11/2005 | Barthold |
| 2005/0250416 A1 | 11/2005 | Barthold |
| 2006/0001645 A1* | 1/2006 | Drucker et al. ............. 345/156 |
| 2006/0048064 A1* | 3/2006 | Vronay ........................ 715/764 |
| 2006/0082068 A1 | 4/2006 | Patchen |
| 2006/0093142 A1 | 5/2006 | Schneier et al. |
| 2006/0160594 A1 | 7/2006 | Brase |
| 2006/0172787 A1 | 8/2006 | Ellis et al. |
| 2006/0224971 A1 | 10/2006 | Paulin et al. |
| 2006/0242234 A1* | 10/2006 | Counts et al. ................. 709/204 |
| 2006/0271433 A1 | 11/2006 | Hughes |
| 2006/0285441 A1 | 12/2006 | Walker et al. |
| 2006/0293103 A1 | 12/2006 | Mendelsohn |
| 2007/0033107 A1 | 2/2007 | Ubale et al. |
| 2007/0050716 A1 | 3/2007 | Leahy et al. |
| 2007/0073582 A1 | 3/2007 | Jung et al. |
| 2007/0082720 A1 | 4/2007 | Bradbury |
| 2007/0088656 A1 | 4/2007 | Jung et al. |
| 2007/0099685 A1 | 5/2007 | Van Luchene |
| 2007/0111770 A1 | 5/2007 | Van Luchene |
| 2007/0112624 A1 | 5/2007 | Jung et al. |
| 2007/0124673 A1 | 5/2007 | Trotto et al. |
| 2007/0130001 A1 | 6/2007 | Jung et al. |
| 2007/0226062 A1 | 9/2007 | Hughes et al. |
| 2008/0009350 A1 | 1/2008 | Ganz |
| 2008/0009351 A1 | 1/2008 | Ganz |
| 2008/0077595 A1* | 3/2008 | Leebow .......................... 707/10 |
| 2008/0109313 A1 | 5/2008 | Ganz |
| 2008/0115087 A1 | 5/2008 | Rollin et al. |
| 2008/0122796 A1* | 5/2008 | Jobs et al. ..................... 345/173 |
| 2008/0134099 A1 | 6/2008 | Ganz |
| 2008/0139265 A1 | 6/2008 | Hardin et al. |
| 2008/0163055 A1 | 7/2008 | Ganz |
| 2008/0215973 A1 | 9/2008 | Zalewski et al. |
| 2008/0221998 A1 | 9/2008 | Mendelsohn et al. |
| 2008/0222295 A1* | 9/2008 | Robinson et al. ............. 709/227 |
| 2008/0280684 A1* | 11/2008 | McBride et al. ................ 463/42 |
| 2009/0029772 A1 | 1/2009 | Ganz |
| 2009/0053970 A1 | 2/2009 | Borge |
| 2009/0054155 A1 | 2/2009 | Borge |
| 2009/0055749 A1* | 2/2009 | Chatterjee et al. ............ 715/738 |
| 2009/0063282 A1 | 3/2009 | Ganz |
| 2009/0069084 A1 | 3/2009 | Reece et al. |
| 2009/0125819 A1 | 5/2009 | Hamilton, II et al. |
| 2009/0131164 A1 | 5/2009 | Ganz |
| 2009/0144638 A1 | 6/2009 | Haggar et al. |
| 2009/0191968 A1* | 7/2009 | Johnson et al. ................. 463/37 |
| 2009/0204420 A1 | 8/2009 | Ganz |
| 2009/0217211 A1* | 8/2009 | Hildreth et al. ............... 715/863 |
| 2009/0221367 A1* | 9/2009 | Longley et al. ................. 463/32 |
| 2009/0253517 A1* | 10/2009 | Bererton et al. ................ 463/42 |
| 2009/0254843 A1 | 10/2009 | Van Wie et al. |
| 2009/0303175 A1* | 12/2009 | Koivunen ..................... 345/156 |
| 2009/0307620 A1* | 12/2009 | Hamilton et al. ............. 715/764 |
| 2009/0313084 A1 | 12/2009 | Chugh |
| 2010/0105484 A1* | 4/2010 | Horneff et al. .................. 463/43 |
| 2010/0134484 A1* | 6/2010 | Chen et al. .................... 345/419 |
| 2010/0151940 A1 | 6/2010 | Borge |
| 2010/0151948 A1* | 6/2010 | Vance et al. .................... 463/43 |
| 2010/0174593 A1 | 7/2010 | Cao et al. |
| 2010/0210333 A1 | 8/2010 | Halash |
| 2010/0280965 A1* | 11/2010 | Vesterinen et al. ........... 705/319 |
| 2010/0306671 A1* | 12/2010 | Mattingly et al. ............ 715/753 |
| 2010/0306702 A1* | 12/2010 | Warner ........................ 715/811 |
| 2011/0092128 A1 | 4/2011 | Ganz |
| 2011/0171934 A1* | 7/2011 | Lim et al. .................... 455/412.1 |
| 2011/0179180 A1* | 7/2011 | Schleifer et al. ............. 709/227 |
| 2011/0207525 A1 | 8/2011 | Allen et al. |

FOREIGN PATENT DOCUMENTS

| | | |
|---|---|---|
| WO | 99/42917 A2 | 8/1999 |
| WO | 01/33327 A1 | 5/2001 |
| WO | 2006/128224 A1 | 12/2006 |

OTHER PUBLICATIONS

Culture Formation and its Issues in Personal Agent-oriented Virtual Society—"PAW^ 2"—Matsuda (2002).
Evaluation of Personal Agent-Oriented Virtual Society—PAW (matsuda@arch.sony.co.jp) (2001).
IGN-complete guide to Pokemon Blue and Red (2006).
Intl Search Report—PCT-CA2009-000271.
Grace, "Web Site Tycoon's Next Goal: Sixth Grade"; Woonsocket Call, Jun. 19, 2002.
http://web.archive.org.web.20031202190119/www.monopets.com/, Dec. 2, 2003.
Real-Money Trade of Virtual Assets: Ten Different User Perceptions—Lehdonvirta (2005).
Virtual Economics: Applying Economics to the Study of Game Worlds—Lehdonvirta (2005).
World of Warcraft Manual (2004).

(56) References Cited

OTHER PUBLICATIONS

DinoKids <http://www.dinokids.com>—accessed on Aug. 31, 2009.
PlanetCazmo <http:/www.planetcazmo.com>—accessed on Oct. 5, 2009.
Littlest Pet Shop Online <http://www.Ipso.com/play.aspx>—accessed on Mar. 26, 2010.
F.A.M.P.S. <http://www.myfamps.com>—accessed on Dec. 14, 2009.
Dora Links <http://www.doralinks.com>—accessed on Oct. 31, 2009.
Skoodles <http://www.skoodlez.com>—accessed on Oct. 29, 2008.
Tamagotchi Tamatown <http://www.tamatown.com>—accessed on Sep. 26, 2009.

* cited by examiner

Close
(1/4 plot)

Medium
(1/2 plot)

Far
(full plot)

Zone
(9 plot)

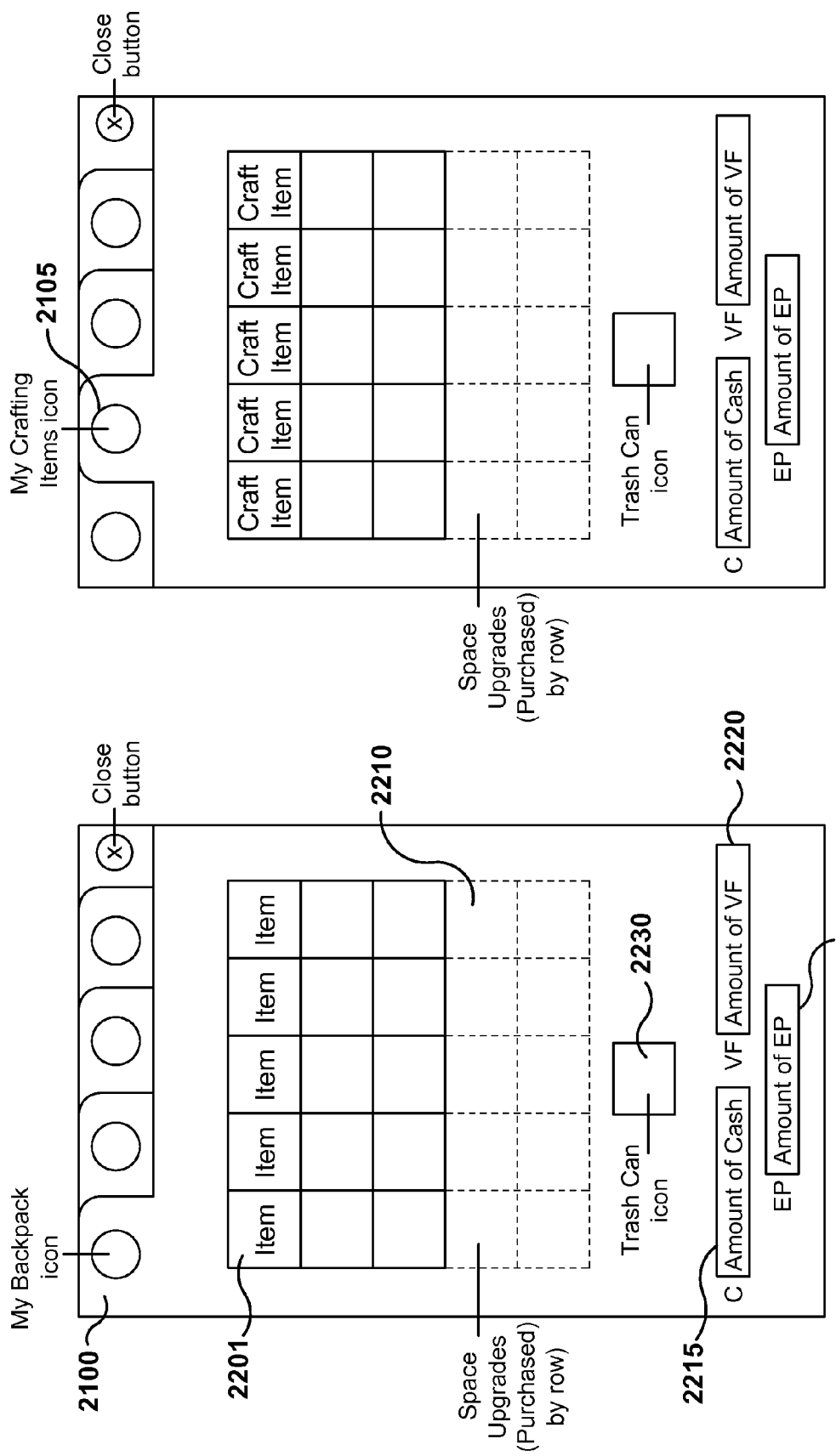

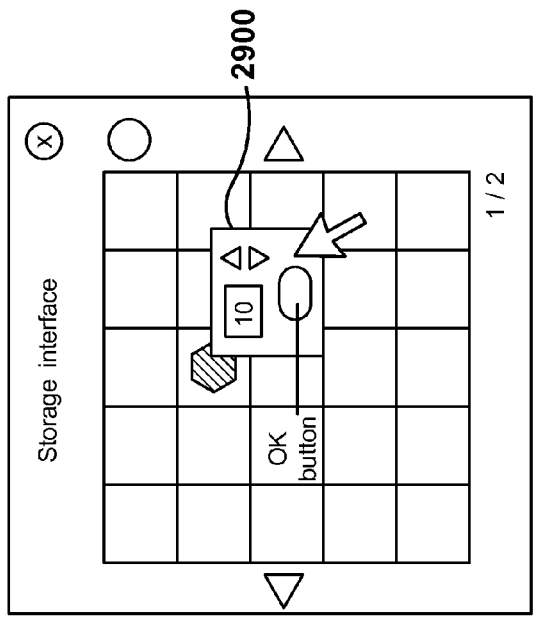
Figure 29
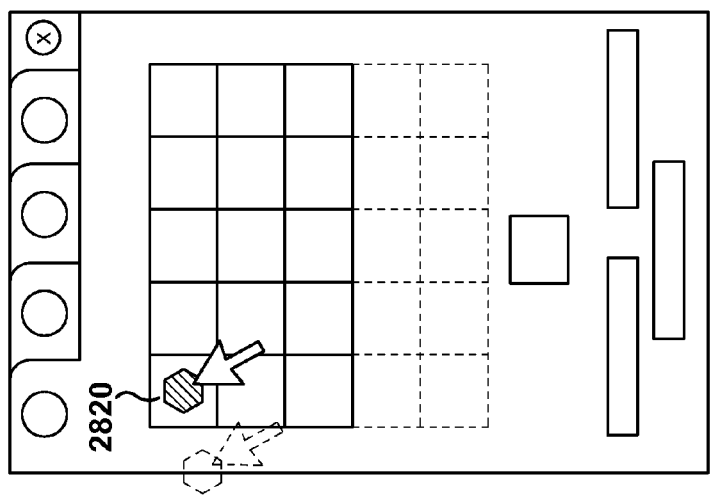
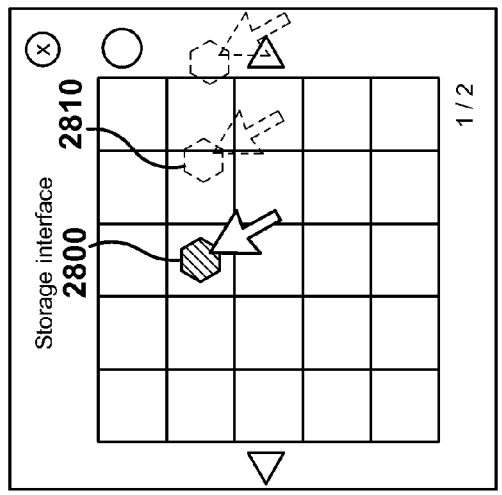
Figure 28

RADIAL USER INTERFACE AND SYSTEM FOR A VIRTUAL WORLD GAME

This application claims priority from provisional application No. 61/327,346, filed Apr. 23, 2010, the entire contents of which are herewith incorporated by reference.

BACKGROUND

U.S. Pat. No. 7,425,169, filed Dec. 30, 2004 describes a system of interacting with a virtual representation of a real world product. According to this system, a user can buy a toy or item which is associated with a special code. The toy exists in the real world, and the code forms a key to the virtual world. The user enters the code on a website and enters the virtual world.

The virtual world 110 provides activities and views with which the user can interact. The virtual world, as part of the interaction, provides a virtual replica 115 of the actual toy 100. Users can carry out various activities on the website using their virtual version of the toy. For example, the user can form a house with rooms, furniture, clothing, and other items. The user can also carry out activities to earn cash, and purchase virtual items using that cash.

SUMMARY

A system according to one aspect defines a user interface used on a computer providing output information in a form to be displayed on a display screen, said output information including virtual world information indicative of a virtual world with which a user can interact, and also including a radial menu for interacting with at least one virtual character in said virtual world, said computer accepting input of an element of said virtual world, said element being a selected element of said virtual world that is selected separately from other elements of said virtual world, and said radial menu having a round portion that shows a picture of said selected element in a center part of the round portion, and where said radial menu also includes a plurality of control indications surrounding only a portion of an outside of said round portion of said radial menu, said control indications representing actions associated with said selected element.

BRIEF DESCRIPTION OF THE DRAWINGS

In the Drawings:

FIGS. 22-25 shows the different possible screens within the my items user interface;

FIGS. 28-30 show moving items between inventory and storage;

DETAILED DESCRIPTION

Figure 1:
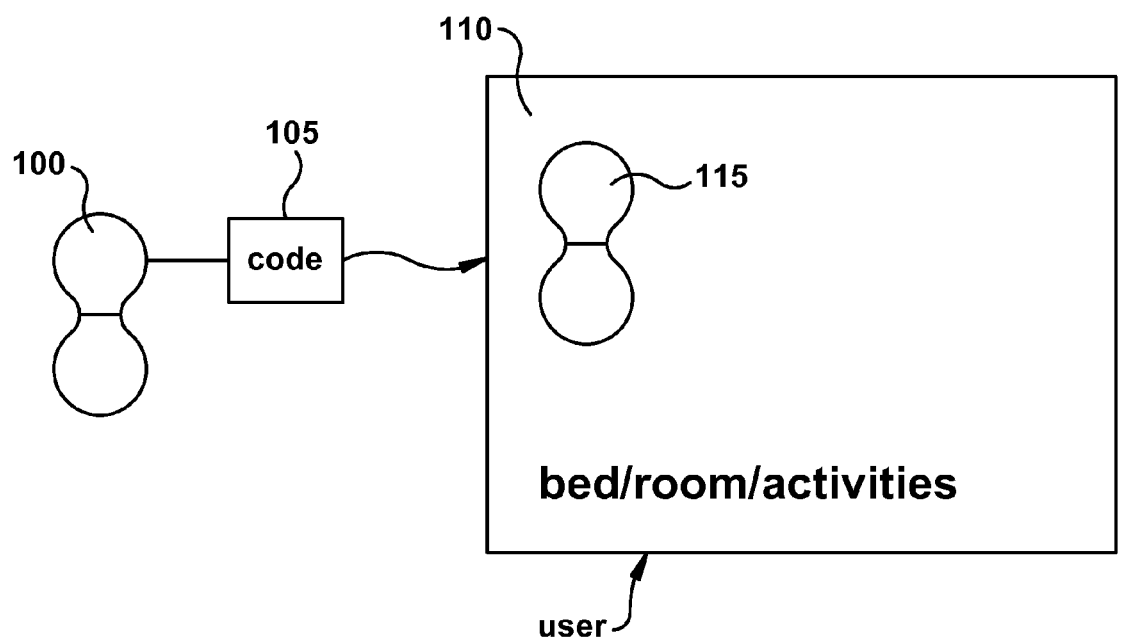
FIG. 1 shows the basic layout of a registration operation in the virtual world.

The present application describes additional aspects, actions and activities and additional structure, for adding to a website of the type described in our U.S. Pat. No. 7,421,569 and as shown generally in FIG. 1. It should be understood, however, that the aspects described herein are not limited to use with the system described in FIG. 1. These aspects can be used with other kinds of websites and/or games; for example, any website that allows user interaction can be used with this system. An embodiment describes new operations using the website illustrated in FIG. 1.

In the embodiment, and in websites such as the Webkinz® website, users carry out activities to earn virtual cash that is usable on the website. The virtual cash can be used to purchase items that are usable on the website, e.g., virtual food, furniture, virtual clothing or other items.

The embodiments describe special user interface sets that allow the user(s) access to many different features in a simplified manner, and that show the user information about a selected item or element in the virtual world while providing options for controlling that item.

Figure 2:
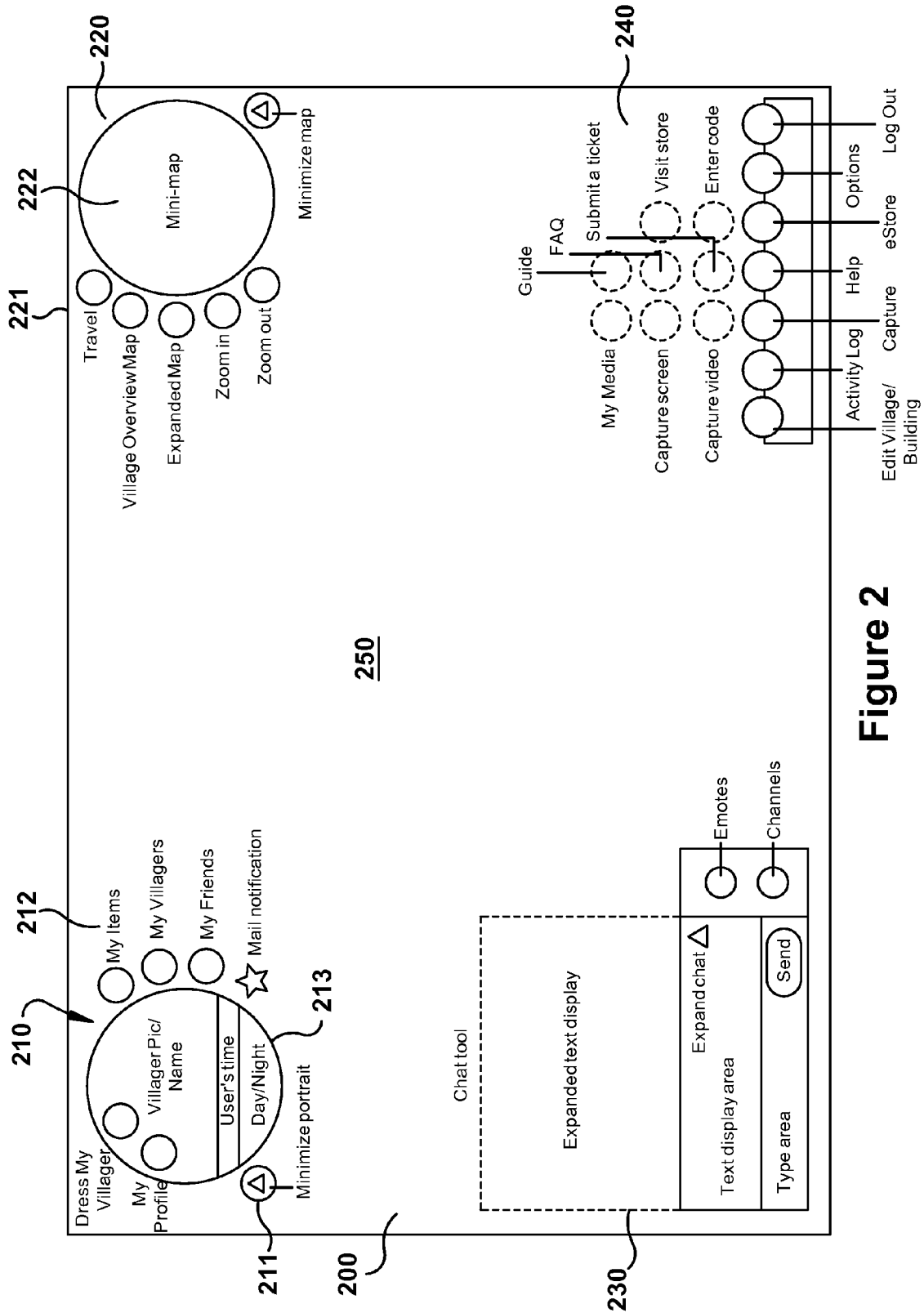
FIG. 2 shows an embodiment of the overall user interface.

A first embodiment of the user interface, called portrait and time frame, is shown in FIG. 2. This embodiment provides players an additional way to connect with their characters, showing a reactive and animated close-up of the current player character's face, while hosting buttons and controls that access much of the game's player and account-level functionality.

Another feature of this user interface is a game clock that provides players with a common game-based time that is the same for all players in the game, independent of the user's actual time zone.

The basic overall layout is shown on the screen 200. The screen 200 includes a number of different sections, including a portrait tool 210, a mini-map section 220, chat tool 230, and navigation portion 240. The portrait tool 210 serves as the main hub for the player's in-game personal management tools, including access to the player's/character's "backpack", described herein that holds the user's items that the user has obtained in the game, the "My Villagers" screen, the "My Friends" screen, the "My Profile" screen, and the "Dress My Villager" screen, as well as the current game world (and real world) time and a new mail indicator. Each of these is described herein.

Figure 4:
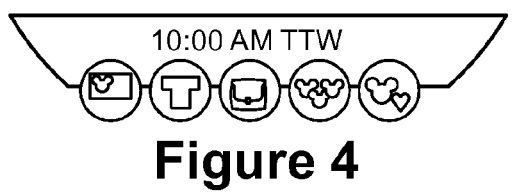
FIG. 4 shows a minimized version of the radial user interface.

A central area of the screen is shown generally by 250 and may be typically used to display and play the main part of the game or to interface with the virtual world. A tool minimize icon 211 may be used to minimize the portrait tool to provide more area for playing of the game or interacting in the environment. See FIG. 4 below, which demonstrates the minimized portrait tool.

In the embodiment as shown, the portrait tool 210 may include a rounded tool frame 213 with different sections surrounding the frame 213, all the parts collectively forming the portrait tool 210.

Figure 3:
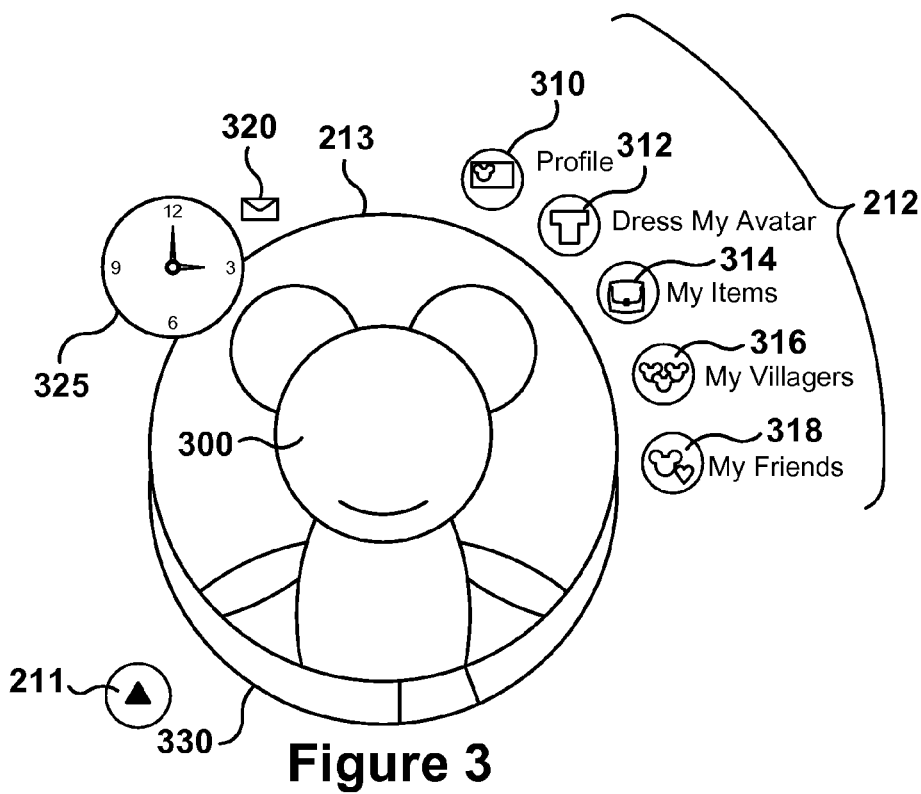
FIG. 3 shows a close-up of the radial user interface and shows the different items that it includes.

FIG. 3 shows a close-up of the portrait tool 210, which depicts that the portrait frame 213 also includes a live, animated portrait or headshot of the player's currently-controlled villager or character 300. The headshot of the character can be animated according to the different conditions of the character. By animating the character, this keeps the player informed about the character's status. For example, the character may be shown as smiling and/or winking to indicate that it is happy when it has been fed, or is in good health, or has been otherwise interacted with. Conversely, the character may be shown as sad or even with tears when it is in bad health, or has not been interacted with.

FIG. 3 also shows the different items that can be selected around the periphery of the portrait frame 212 which can refer to different characteristics which can be selected. Interaction with the portrait tool 210 is carried out by players using the buttons in the tool section 213 surrounding the portrait frame 212 to access key game tools.

The buttons in the tool section 213 include a profile button 310 which toggles visibility for the "Profile Page" UI (user interface) screen when clicked. A "Dress My Villager" button 312 analogously toggles visibility for the user interface to dress the villager represented by the headshot 300. The "My Items" button 314 toggles visibility for the "My Items"/Backpack user interface screen when selected. In similar ways, the "My Villagers" button 316 provides an access to the list of different villagers that are associated with the user, e.g., that have been collected and registered by the user. A "My Friends" button 318 provides information about the user's friends in the virtual world.

Figure 5:
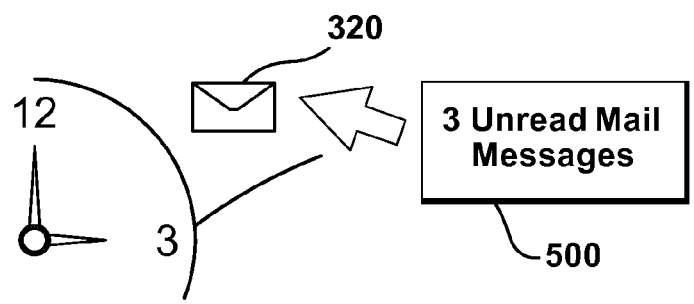
FIG. 5 shows a close-up of the mail function on the interface.

The portrait tool also includes a "Mail" notification icon 320 that appears adjacent a clock 325 when the player has unread mail in their in-game mailbox. A close-up of this notification icon is shown in FIG. 5. Rolling over this icon reveals a tooltip shown as 500 that indicates how much unread mail the player currently has (e.g., "three Unread Mail Messages").

Another function of the portrait tool 210 is to provide the clock 325 which acts as the player's in-game clock. In one embodiment, this is used with a social networking game, that provides players in each world within the game a point of reference of time in the world (hereinafter "world time" or WT) regardless of their actual time zone. WT can be, for example, the server time of the servers hosting the game. This time will not be indicated with any real time zone such as EST, but rather as WT. For example, imagine the world is called Tail Towns™ World (TTW). In this example then, the time reference is TTW such as 10:00 AM TTW as demonstrated in FIG. 4.

To allow users to map TTW time to their own time easily, the portrait tool 210 allows rolling the cursor over the clock 325 on the portrait tool 210. Responsive to that rolling, programming in the computer then reveals a tooltip that has both the full time/date in TTW (on the server) and the player's local time and date (drawn from the client's computer).

Figure 6:
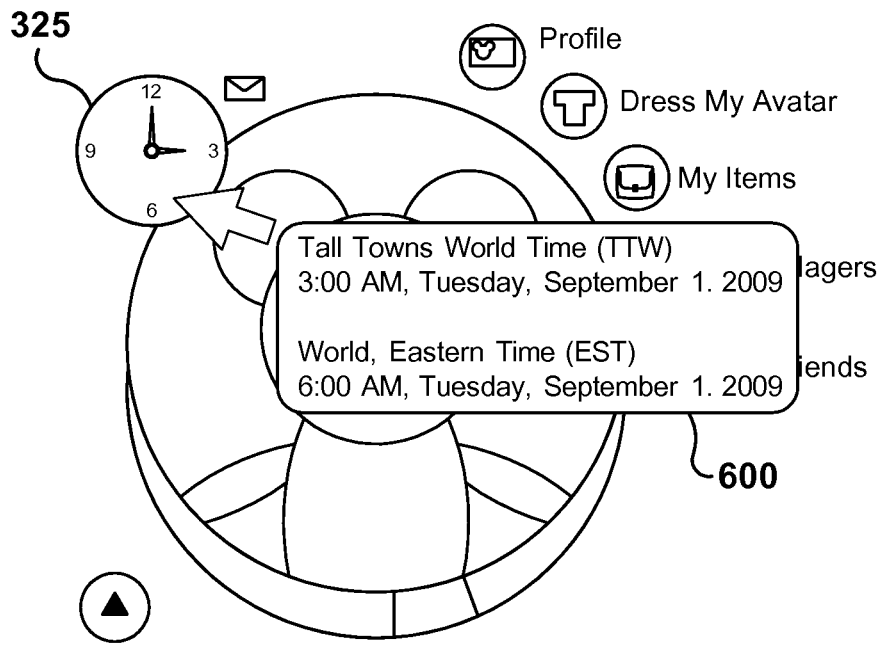
FIG. 6 shows a close-up of the time function on the radio user interface.

FIG. 6 shows a close-up of this functionality, where rolling over the clock 325 causes a view 600 of the times: both the TTW time, as well as the time set forth on the user's computer (e.g., EST). According to one embodiment, the player's local time is not stored on the server or verified; it is purely a shortcut to the user's computer time for ease-of-access.

Referring again to FIG. 3, the portrait tool 210 also shows a close-up image of the user's active character 300, which is the character the user is currently controlling. This image is not necessarily static. It may be animated, indicating to the player the villager's current mood and nourishment level as taken from actions in the Tail Towns™ virtual world.

At different points during gameplay, the character 300 in the portrait tool 210 is animated by actions in the server computer. The animation may also represent a "Special Moment". The "Special Moments" indicators operate at key moments during gameplay. During these times, the player's character portrait 300 in the portrait tool 210 animates to indicate the character's current feelings. Those moments, and the related animations, include the following:

Switched to the Villager—the villager waves "Hello" before returning to current hunger state animation.

Successfully completing a craft, mini-game or quest—the villager smiles/cheers/claps with excitement before returning to current hunger state animation.

Failing a craft, mini-game or quest—the villager frowns/pouts momentarily before returning to current hunger state animation.

Animations in general can include:
Waving Hello (Villager switch)
Happy/Excited (Successfully completed quest/craft/mini-game)
Disappointed/Sad (Failed quest/craft/mini-game).
There are also satisfaction and energy indicators.

Players will also be working towards maintaining a general level of satisfaction and energy. The "Energy" rating is effectively a measure of how tired the character is. The satisfaction rating is based on a number of different criteria. Satisfaction is shown to the player through the facial expressions of the character 300 in the portrait frame 212.

The portrait tool 210 also includes a single meter called the satisfaction meter 330, used to indicate the character's current satisfaction level. The meter is shown in more detail in FIGS. 7-10. The meter includes a bar 700 that has one dark-colored section that indicates the character's "Overall" satisfaction and a transparent section that indicates the character's "Current" satisfaction.

Figure 7:
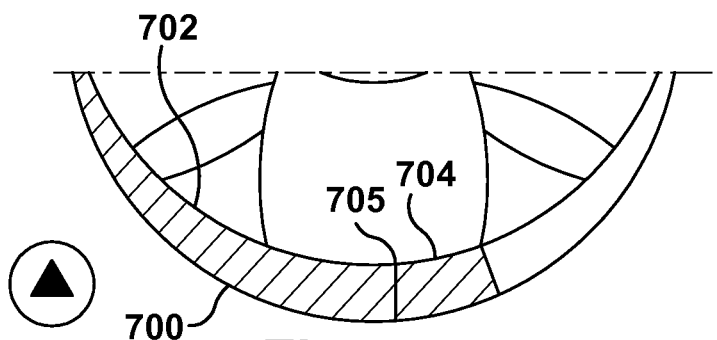
FIGS. 7-10 show the satisfaction meter on the radial interface.
Figure 8:
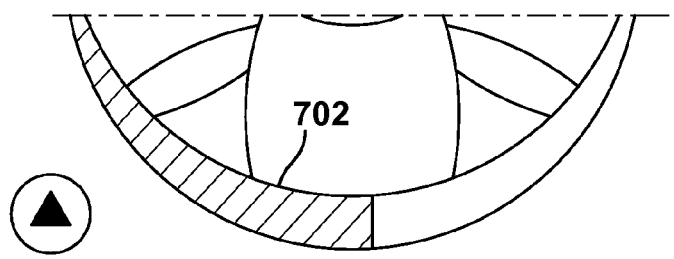
Figure 9:
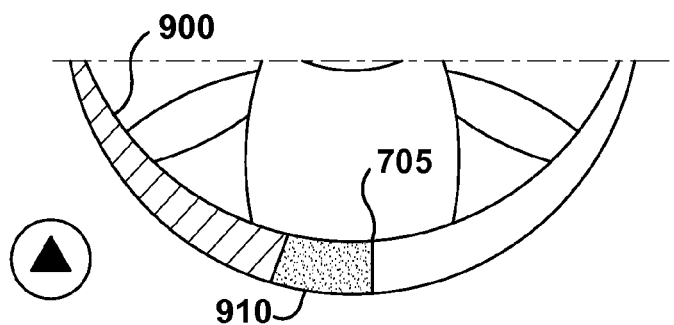

The meter grows from left to right. FIG. 7 shows that the current satisfaction is high, since the portion 702 is filled in passed the "even" mark 705 into the section 704. The "even" mark 705 represents a boundary line of "even". FIG. 8 shows only the section 702 being filled in, thus representing the villager's "even" satisfaction. In FIG. 9, the area below the boundary line 705 is not completely filled, such that only the area 900 is filled and the area 910 is unfilled. This unfilled section 910 represents an underclocked satisfaction level, which means that the character's satisfaction is less than average. In this way, at a glance, a user can readily tell the happiness of their character by reference to how much of the bar 700 is actually filled.

Figure 10:
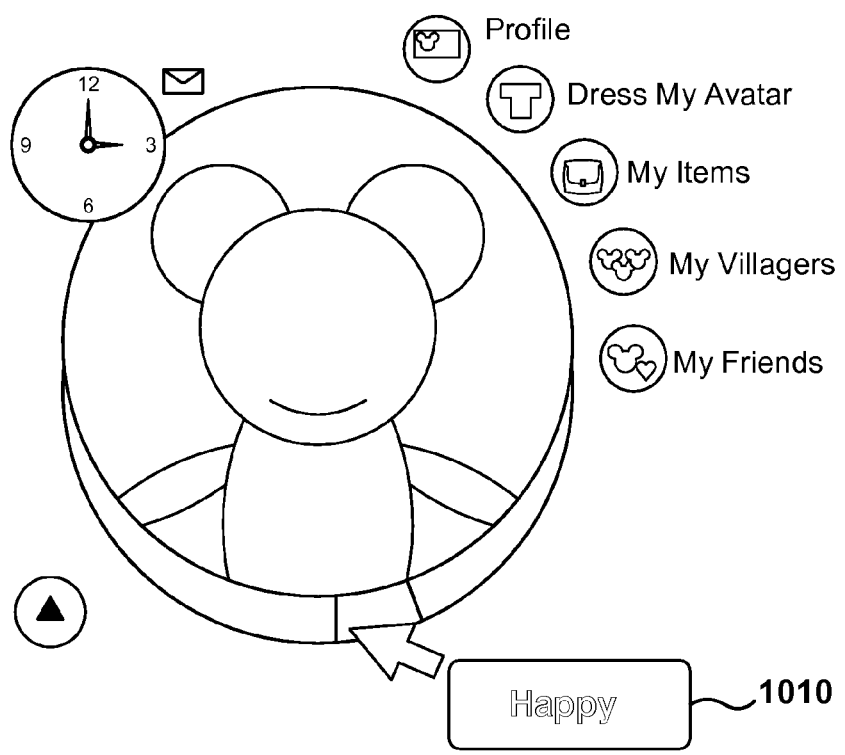

FIG. 10 also shows the bar of FIG. 7, where the user's character is happy. Rolling over the meter reveals a tooltip with a single word that reveals the general "state" represented by the meter. In this embodiment, rolling over the meter of FIG. 10 shows the word "happy". A completely filled bar can show "ecstatic", and an empty bar can show "unsatisfied", for example.

One intent of the embodiment is to play a social game, and to encourage players to interact with other players. Players are able to interact with one another using the same kind of radial menu as the portrait tool 210, here called an "Interaction Choice Radial Menu" interface.

Figure 11:
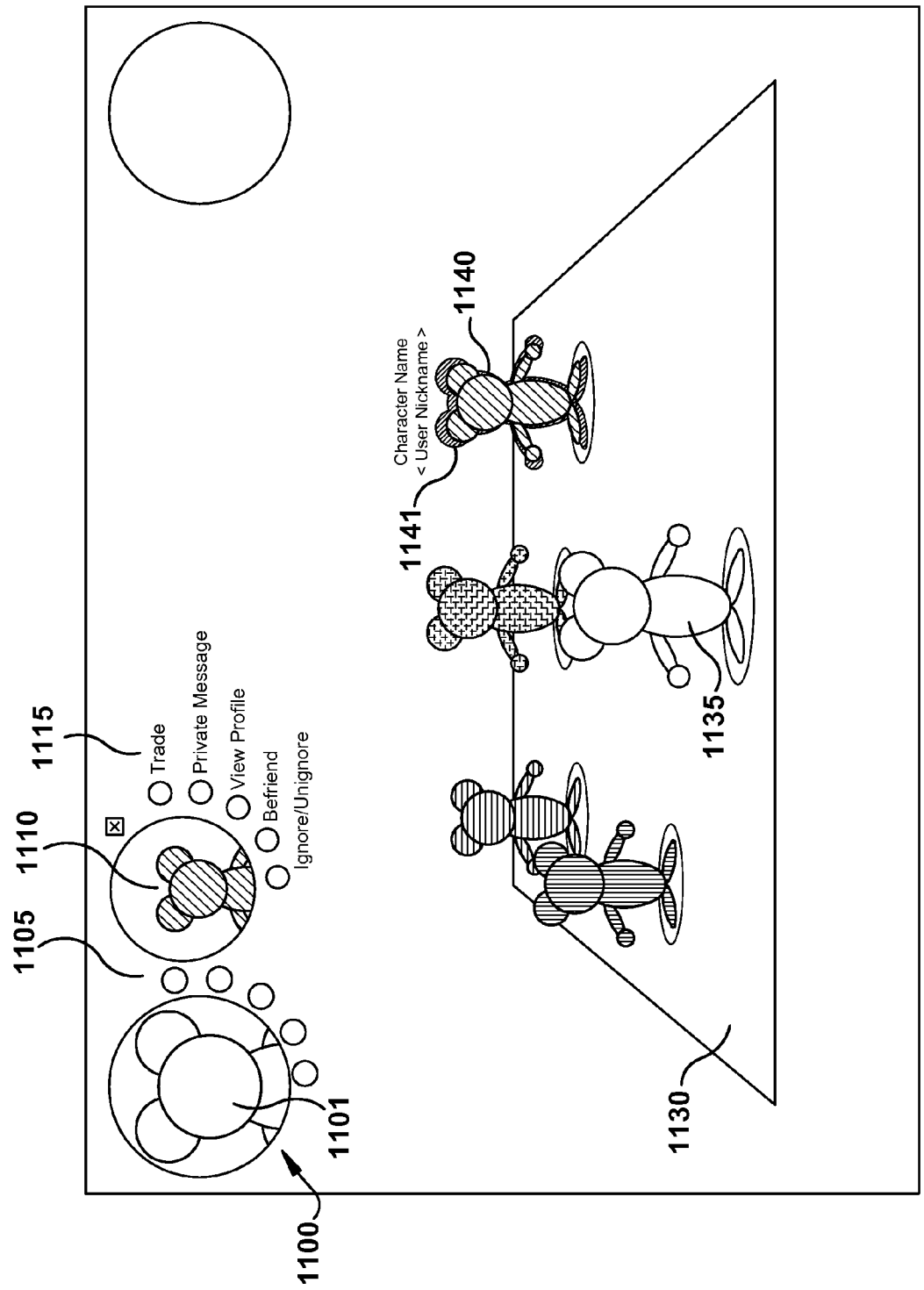
FIG. 11 illustrates an embodiment of the user interface as used for player to player interaction.

The radial menu 1100 of this embodiment is shown in FIG. 11, and may include, for example, an animated character 1101 forming the center of the menu 1100, along with buttons 1105 that form the outer portion of the menu 1100. This embodiment of the radial menu 1100 facilitates various Player-to-Player interactions, including communication, trading, inspection, physical interaction and friend interaction.

Users can use the Player-to-Player interaction radial menu to communicate with other players. Through the interface, players are able to send private messages, add friends, and ignore other users. Users may also use the player-to-player interaction radial menu to trade with other villagers. According to one embodiment, the direct player-to-player trading interface is accessible solely through this radial menu.

Users may use the player-to-player interaction radial menu to view other villagers' profiles. Because villagers (players) are constantly on the move, Player-to-Player uses a simple static targeting system to allow the user to first select a villager in the world and then interact with the target icon rather than the moving villager.

When the user single or double clicks on another villager, that villager is set as a target of the user. The target (the portrait of the villager that was selected) appears in a second, smaller "Target Portrait" frame 1110 with its own smaller, circular Interaction Radial Menu icons 1115. Unlike normal in-world item interaction, the player's character (villager) does not become the target character and does not move to the center portion of the radial menu 1100 when that character (villager) is selected. Rather, this embodiment opens a new radial menu for the selected character.

The target portrait 1110 also has buttons which the user can use to access different functionality. The buttons 1115 that straddle the target portrait 1110 all involve interacting with the target villager. For example, these buttons allow the player to trade, send private messages to, view the profile of, befriend, and toggle ignore status with regard to the target Player.

According to one embodiment, a target character (and its target portrait) will only stay selected while the two players are in the same zone. FIG. 11, for example, shows the player zone 1130 having five players, including the user player 1135, and the target 1140. When the targeted player leaves the zone, the target portrait 1110 automatically closes and any pending interactions via the radial menu, except for private messages, are cancelled.

In addition to appearing in the target portrait upon selection, the target player is also marked with a small "Target Indicator" glow that surrounds the player. This glow will follow the target player as it moves until the player is no longer targeted. The glow is shown as a shaded area 1141 in FIG. 11, however, in embodiments, it can actually be viewed as a highly visible and distinct glow which has a noticeable different color.

Selecting the "Trade" button sends the target player a "trade invite". If the user tries to send an invite to someone who is already busy (i.e. involved in another trade), a system notification message such as "Invite not sent, <PLAYER NAME> is busy" is sent via a chat tool, and no invite is sent. Otherwise, the user is invited to trade.

Additionally, a trade invite will fail if the two players are not in range of one another; players must be within a prescribed distance such as a 10-body (microtiles/units) radius of one another to initiate a trade. When players are not in the prescribed range of one another, the trade button will not appear as an option on the target radial menu.

Figure 12:
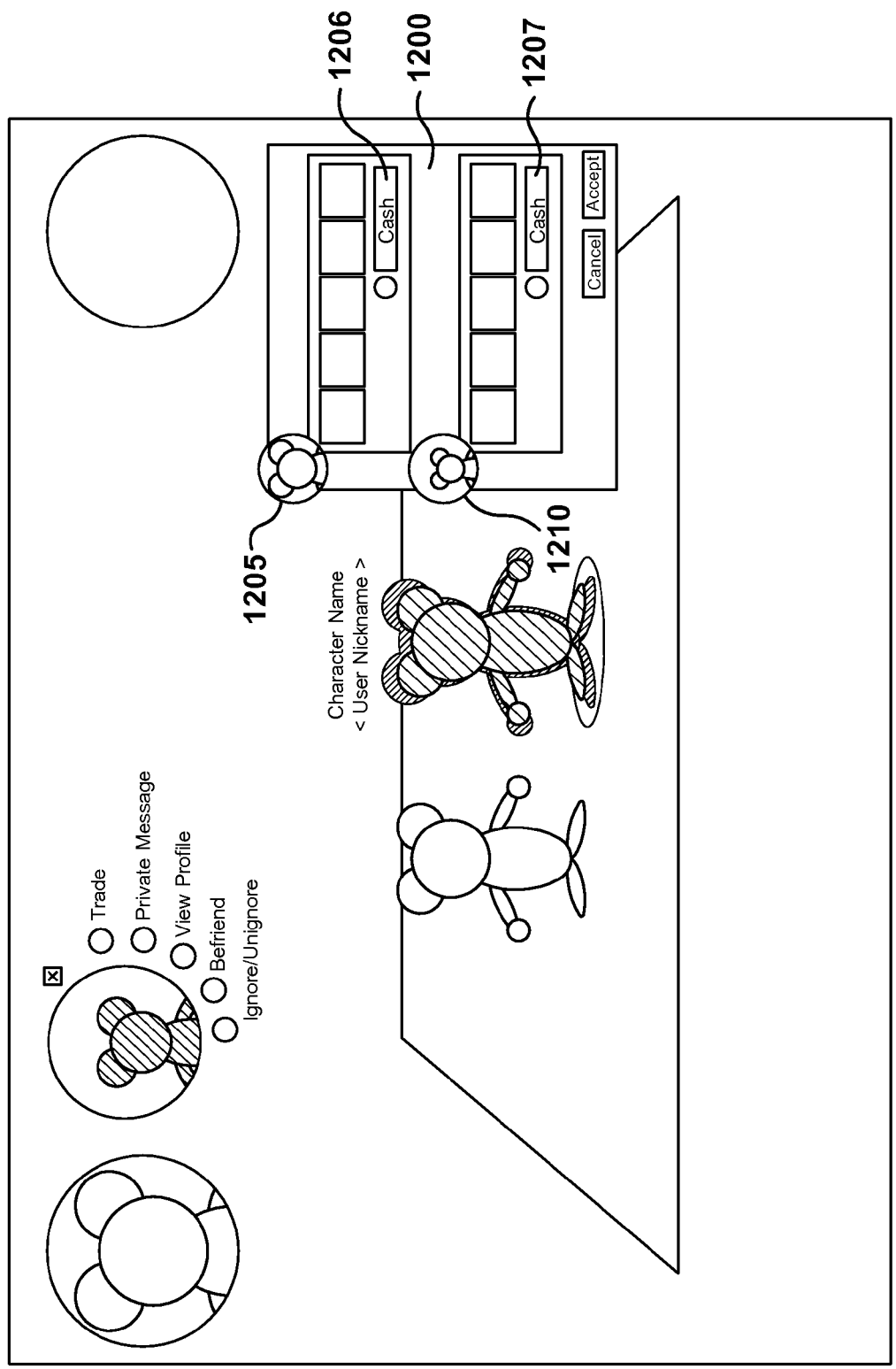
FIG. 12 shows the embodiment with different pop-up interfaces for trading.

Once a trade invite has been successfully sent, the target Player is shown an alert message in a standard notification area as shown in FIG. 12 that notifies the target Player that they have received a trade invite. The alert has an "Accept" and a "Decline" button in addition to a countdown timeout which will automatically decline the invite after 10 seconds, for example, if no response is received. Note that the invite is only an invitation to trade, and not an acceptance or an agreement that a trade must be completed.

Should the player accept the trade invitation, the trade is initiated, and the trade interface 1200 appears. The trading interface itself has an area with 5 item slots. The user sees his own character at 1205 and can drag one or more items from his inventory to one of these slots in order to offer it for trade. The interface also shows the target character 1210.

The user cash icon 1206 and a target cash icon 1207 are also shown. This allows adding both in-game cash and eStore points to be traded to the other player in the transaction or received from the user in the transaction. The user is able to type a number into either of these fields, or increase/decrease the number by clicking on up/down arrow buttons that appear beside each one.

Responsive to the number in either field being changed, an "OK" button is displayed; the user must click this button to finalize the amount that the user wants to offer.

A drag and drop functionality is used in this embodiment. Players drag the 2D icons from their inventory to the appropriate slots in the trade interface.

Figure 13:
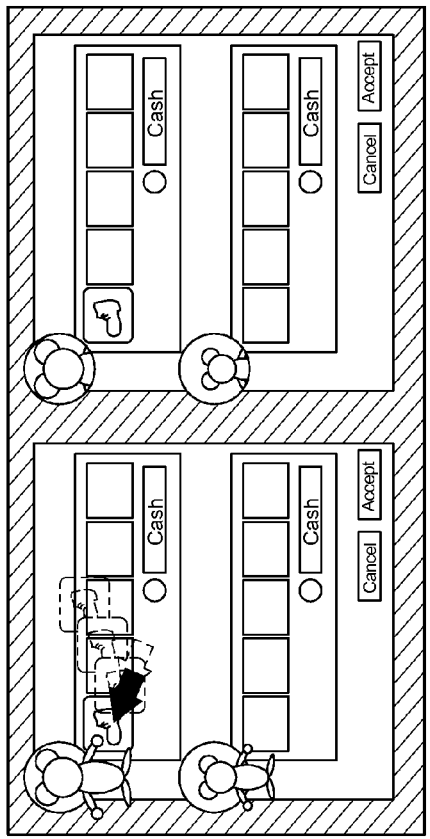
FIGS. 13-15 show different interaction screens for the player interaction.
Figure 14:
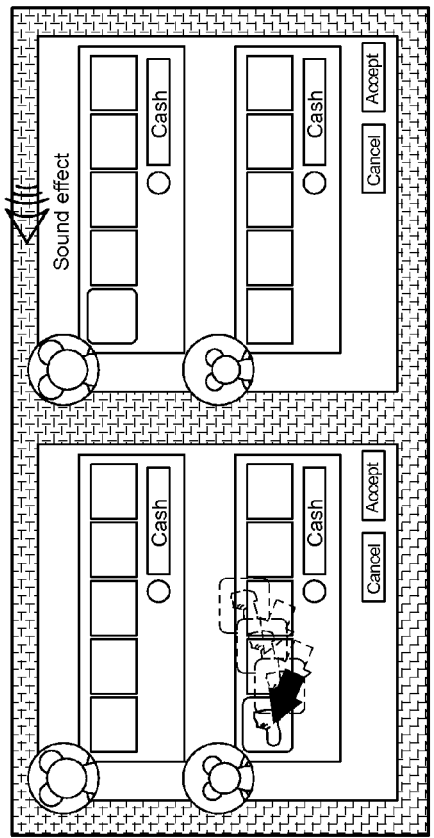

Dragging an item into a slot from the inventory will place that item in the trade slots and remove it from the player inventory as shown in FIG. 13. Dragging an item back from the slot to the inventory will remove it from the slot and add it to the inventory as shown in FIG. 14.

Figure 15:
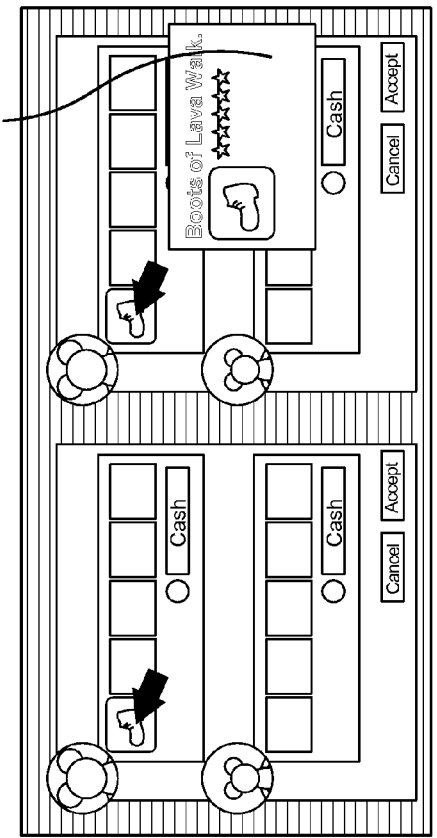

Additionally, rolling over a 2D icon in any of the slots on the trade window will reveal its item card 1500 as shown in FIG. 15. Both parties then see the currently-slotted items in real time, and both players are able to mouse over each of the slotted items in both slot sets for the item card description at their discretion.

Dragging an item to the other player's trade slot will make the slot red to indicate to the player that the item cannot be dropped there, and dropping the item will result in the object being left in the inventory and a sound effect is triggered (error sound).

The mini-map 220, which was previously shown in FIG. 2, and discussed in detail herein, is shown in this embodiment in the top-right corner of the screen 200. As explained herein, the mini-map forms another embodiment of the user interface, with the same overall user interface shape (the radial function) as the portrait tool. The mini-map 220 is shown in FIG. 2 as surrounded with control buttons and related functionality, as explained herein.

The mini-map helps players to navigate the world of Tail Towns™. The map will help players locate their villagers, directed activities, and buildings at any time, and navigate others' villages, as explained herein.

The mini-map defines a circular area, which as shown on the right side of the screen, is straddled on its left side by a number of buttons that relate to functions of navigation—such as travel, overview map, expanded map, zoom in and zoom out. The central part 222 of the menu shows a 2D, top-down, low-detail view of the player's current location (Starter Town, the player's village, or someone else's village) and various important landmarks, including buildings, the player's villagers, and more.

Figure 16:
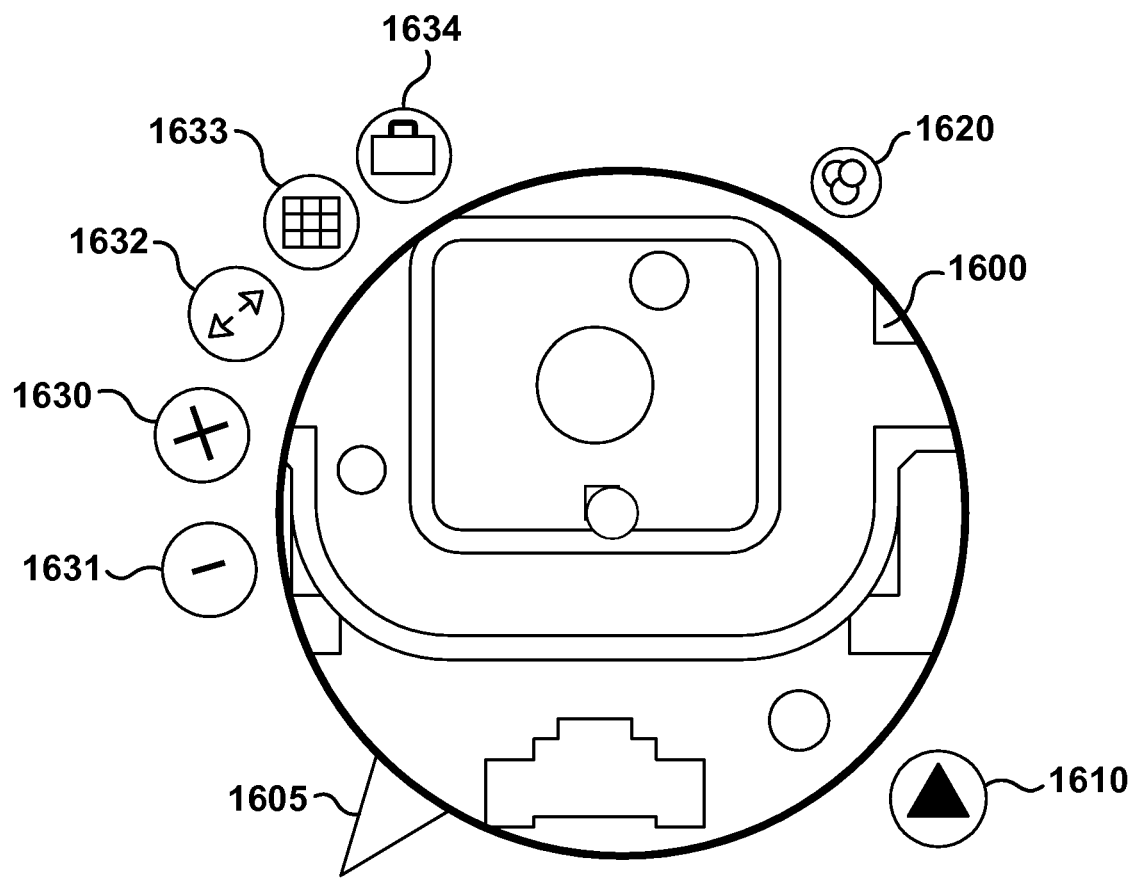
FIG. 16 shows an embodiment where the radial user interface is used with a mini map.

FIG. 16 depicts a circular menu center 1600 showing a low detail map of the player's viewpoint of the virtual environment with these parts. The function buttons 1630-1634 are positioned along the outer edge of the menu center 1600 and are shown with pictorial indications of their functions.

In one embodiment, the mini-map will not appear when a player is in an interior space (e.g., inside a building or house). It will only be visible when the player is outside such as walking around a village or Starter Town. The mini-map stays in the top-right corner of the screen, consistently.

The mini-map will also contain markers to indicate the following:

- The user's Player (always this marker stays in the center—the map moves as the Player moves)
- Players belonging to the user's Village—mates (no other Players are marked)
- Villagers owned by the user. Using the My Villagers interface, the user can select a single Villager to highlight with a special marker.
- Goals for any in-progress Directed Activity. The minimap also includes an arrow 1605 that always points in the direction of the next goal, if the user is in direction toward that goal. For example, when following a directed activity, the arrow will constantly point to the Directed Activity until the Directed Activity icon itself is visible. The icon rotates around the frame to always point to the objective's position relative to the Player's current position. This arrow will only point to Directed Activities that reside within the area (so an indicator arrow would not show up for a Starter Town quest while a player is in her Village, for example).

Figure 17:
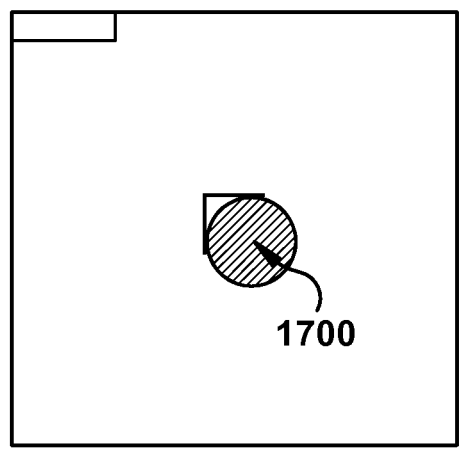
FIG. 17 shows a close-up of the user and their pointing within the mini map environment.

The 2D map 1600 is dynamically generated to show the player Villages and building placement that are constantly changing. The map shows the player's current position relative to the world around them. In an embodiment, the 2D map itself will not turn as the player moves; the map will always maintain a northward facing, and the player's facing is clearly indicated through its map icon, as shown in FIG. 17, which shows a detail of the player 1700, and a pointer that shows the direction of facing of the player. The map is also updated in real time to reflect recent changes in the current map.

The map also allows players a quick way to move. Players are able to click a location on the mini-map to set the movement destination marker. Once the marker is set, the player begins moving to the marker. Icons on the map have a rollover nameplate which indicates what the icon represents; building names, villager names, friend names, and Directed Activity titles are shown as tooltips for the icons on the minimap.

The map also has a minimize button 1610 in the bottom-right corner. This button minimizes the minimap.

The map display includes icons which will help the player navigate the world with a quick bird's eye view. All of the following markers can be made visible on both the mini-map and the expanded map. The icons will scale in size relative to the current level of mini-map zoom (i.e., the higher the zoom, the smaller the icons).

The player is represented by a small circular icon with a cone extended from it as shown in FIG. 17. The circle represents the player's current position, and the cone represents the player's current directional facing. As the player turns and moves, the cone turns and the icon will move to reflect the player's facing and position. The Player icon will always be in the center of the mini-map, but not centered on the expanded map.

Villager Buildings are displayed on the mini-map by a small 2D icon. These icons are clear representations of what the building is (so, for example, the bakery may have a small "Cake" symbol superimposed on a house icon).

These icons are dynamically linked to building position; should a building in a village be moved, the map will update to reflect the changes each time it is opened (i.e., a building update would be done after opening and closing the map again as opposed to in real time).

Figure 18:
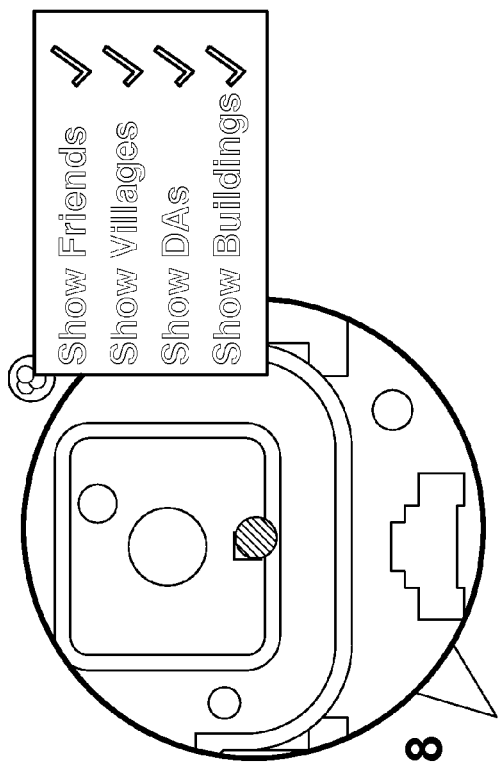
FIG. 18 shows the different options for showing within the mini map.

To allow players more control over what they can and cannot see on the mini-map, all of the aforementioned markers can be filterable. A small UI button 1620 attached to the mini-map will summon a list of the different markers which can be toggled. FIG. 18 shows the toggle, and how players can choose to display or hide friends, villagers, Directed Activities, and buildings on the mini-map. A small icon (e.g., checkmark) indicates which markers are turned on. By default, all of the markers are turned on. Clicking the marker text toggles its visibility. These filter options apply both to the mini-map view and the expanded map.

In embodiments, players are able to filter in and out the following options:
Friends
Villagers
Directed Activities
Buildings
Bakeries
Farms Players are typically not able to toggle visibility of the player's Player icon. That icon must be visible at all times so that the player's position in the game world is always made clear.

Figure 19A:
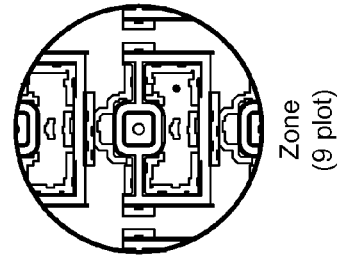
FIGS. 19A-19D show the different zoom levels within the mini map.
Figure 19B:
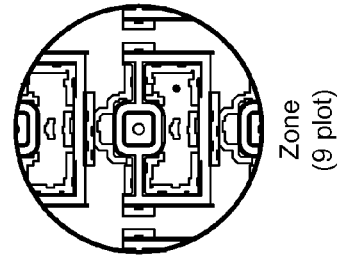
Figure 19C:
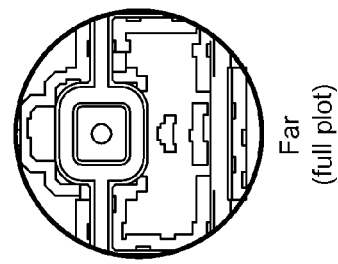
Figure 19D:
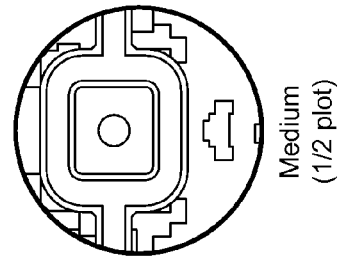

The function buttons include "Zoom In" 1630 and "Zoom Out" 1631 functionality for the map. These buttons, marked "+" and "−", toggle between levels of map zoom (e.g., 4 levels): close shown in FIG. 19A, medium shown in FIG. 19B, far shown in FIG. 19C, and zone shown in FIG. 19D. "Close" shows roughly ¼ of the plot's area relative to the Player position, "medium" ½, "far" the full plot, and "zone" a 9 plot spread.

Figure 20:
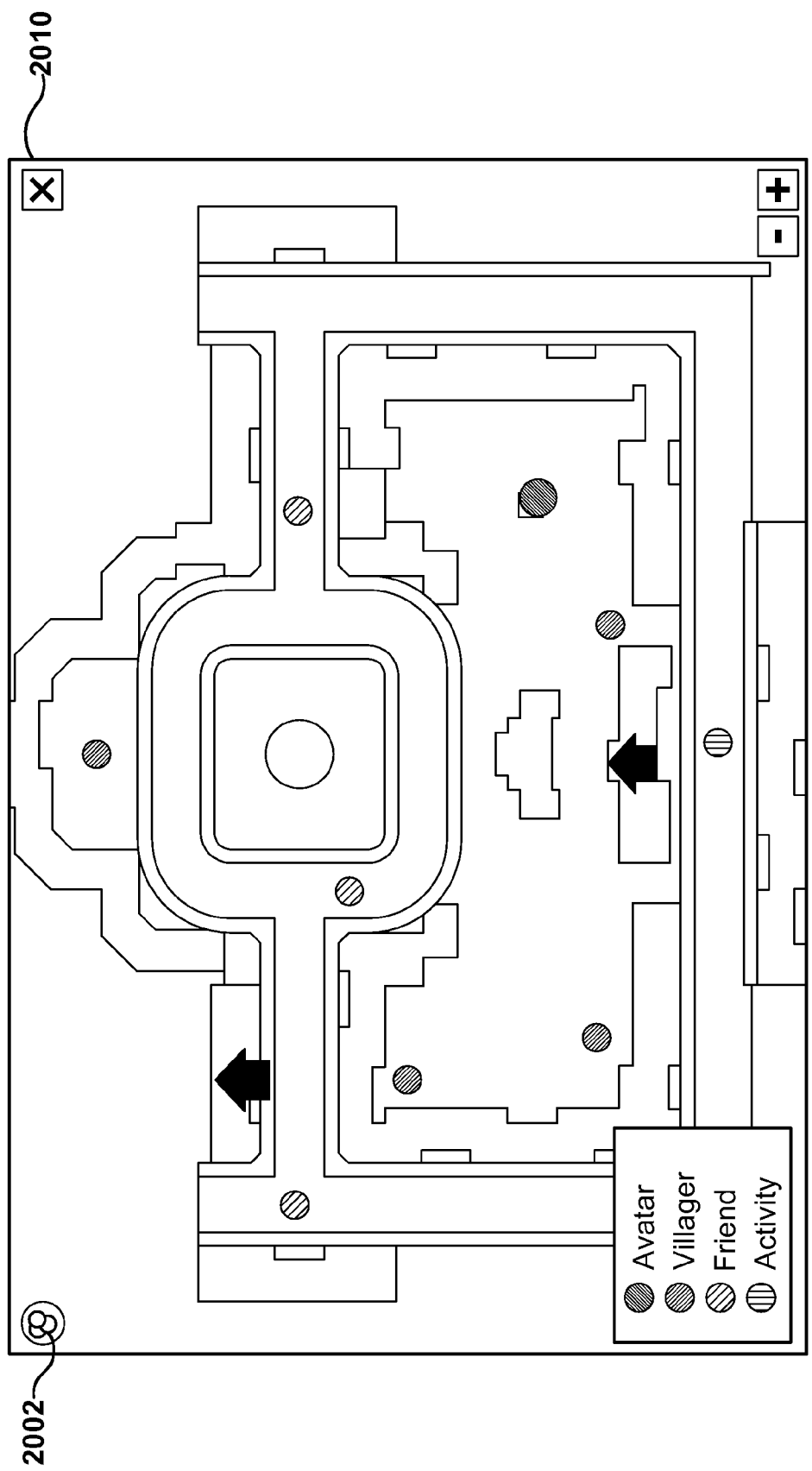
FIG. 20 shows the expanded view from the mini map.

The "Expand Map" button 1632 next to the mini-map provides a full-screen view of the entire Village space as shown in FIG. 20. All the appropriate markers are shown, as well as a number of buttons. A small filter button 2002 is accessible on the Expanded View which allows users to filter the map's contents in real time. This button has the same functionality as the FIG. 18 filter, using the active filters are shared between both of the map views (normal and expanded). These are accompanied by a key exclusive to the Expanded View, explaining what the on-map icons represent.

Players are allowed more control over the map in the Expanded View, as well. Players can also pan around the map by moving their mouse cursor over the edges of the map. A set of zoom in and zoom out buttons are included to allow the players to cycle through the zoom levels.

A small "X" button located in the top-right corner of the full-screen map allows players to return to normal gameplay. When the expanded map is closed, it is returned to its current position: any panning the player did is discarded.

The "Travel" button 1634 accesses the game's travel tools.

Another portion of the overall user interface 200 is the inventory interface 2099, selected via the "my items" button 212. This allows viewing all of the items that the user is currently carrying. This interface is divided into 4 tabs—My Backpack 2100, My Crafting Items 2105, My Village Items 2110, and My eStore Items—that each hold a different kind of item. The Backpack and Crafting Item tabs have a limited storage capacity, so that the user can only carry a certain number of tradable items at once. However, the user can possess more total items that the inventory allows, as there are many storage objects that the user can purchase.

All of the buttons on the GUI, by default, appear to be small and semi-transparent. When the user moves her mouse over them, they should become larger and "fill in" to 0% transparency.

Figure 21:
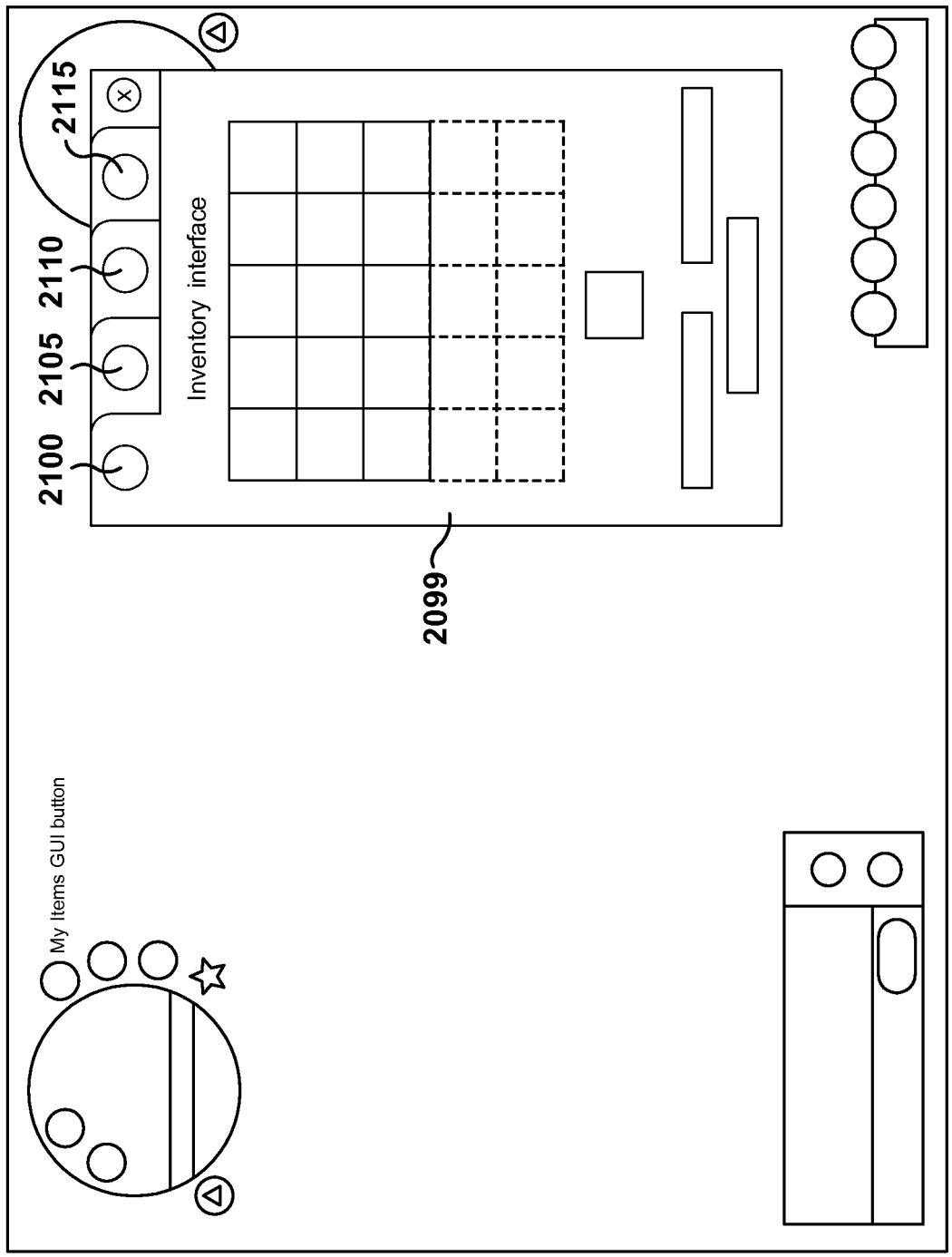
FIG. 21 shows the portion of the user interface that holds user items, called the "my items"

The interface 2099 appears overtop of the simulated 3D environment usually shown in the area 250. It may be positioned on the right-hand side of the screen, covering the mini-map—as illustrated in FIG. 21. However, the user is able to drag the top bar of the interface (beside the tabs) to reposition it wherever desired on screen.

The top of the interface has four tabs, each labeled with an icon: My Backpack, My Crafting Items, My Village Items, and My eStore Items. The user can click on these tabs at any time to toggle between the three different inventory screens. Each screen has its own interface elements.

The My Backpack screen is shown in FIG. 22. The user's Backpack includes all the items that a user is carrying at the moment. The slots 2201 hold any item that can be placed inside of a Building or used on a Villager; this includes furniture, items which can be given to others, clothing, food, emote consumables, etc. For users with a paid account, the Backpack has 15 slots by default. Free users are only given 10 slots. Each slot can hold a single item (or group of items). The user is able to purchase additional Backpack slots from the eStore, to a maximum of 25 slots. These upgrades are sold by row, such as upgrade row 2210, so the user is essentially unlocking 5 slots at a time. If these additional slots have not yet been purchased, they appear grayed out on the interface.

There are three fields at the bottom of the My Backpack screen, representing the user's amount of in-game cash 2215, village Fund 2220 (a different currency from in-game cash), and eStore Points 2225. Each field is labeled with a different icon. These icons also have rollover tooltips. The currency numbers are dynamically updated, so that at any given time, they will accurately reflect the amount of money that the user has. These fields will also appear on the Crafting, Village and eStore Item screens.

The My Crafting Items screen is shown in FIG. 23. This section of the inventory holds all of the character's crafting components. This includes any item that can be placed into the slot of a crafting template. Like the backpack, the crafting items screen will start out with 15 slots, and can be upgraded to 25. Any upgrade the user purchases from the eStore is applied to both screens simultaneously; so if the user has 20 backpack slots, they also get 20 crafting item slots. The Crafting Items screen will display the same three currency fields as the backpack.

Figure 24:
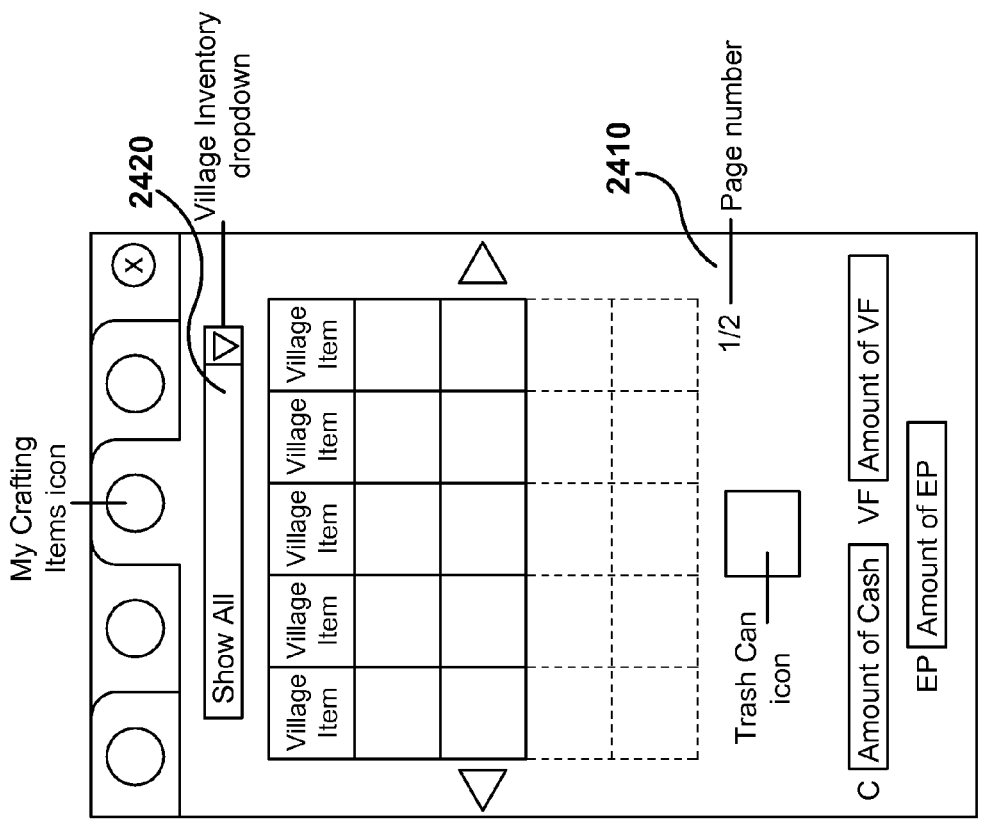

In the same way, the My Village Items screen, shown in FIG. 24, holds any item that the user can place outside in her village—meaning structures, building upgrades, village improvements, house expansions, and house upgrades.

Unlike the backpack, the village items screen has unlimited storage space. In order to accomplish this, there can potentially be multiple "pages" of slots. Twenty-five slots are displayed on the interface at once; should the user have more than 25 items in their village inventory, they can click on the "Next" button to view the second page containing another 25 slots. The "Back" button can be to return to the first page, and so on. There are lines of text 2410 below the storage slots to indicate to the user the total number of pages in her inventory, as well as the page that the user is currently on. It should be formatted like: "[current page]/[total pages]."

There is a simple animated transition between one inventory page and another, which should play whenever the user clicks the "Back" or "Next" buttons. If the user is currently on the first page of their inventory, the "Back" button is grayed out; if the user is on the last page, the "Next" button is grayed out. Should the Village Items screen only need a single page—meaning that it contains 25 items or less—the "Back" and "Next" buttons, as well as the page number text, will not appear at all.

The village items screen also displays the three currency fields. At the top of the village items screen, there is a drop-down menu 2420 that allows the user to filter the items that are being displayed. This menu will contains the following options, in this order:

Show All (selected by default)
Structures
Building Upgrades
Village Improvements
House Expansions
House Upgrades Each option will correspond to a tag on the backend—so the "Structures" option will display only items that have been marked as "Structures." The interface automatically updates to show the appropriate items as soon as the user clicks on one of the options. The number of inventory pages in 2410 is updated accordingly. For instance, if the user has 50 Village items in total—meaning that there are 2 pages on the default "Show All" option—and only 25 of them are structures, the interface would go from having 2 pages to 1 as soon as the user selects "Structures."

Figure 25:
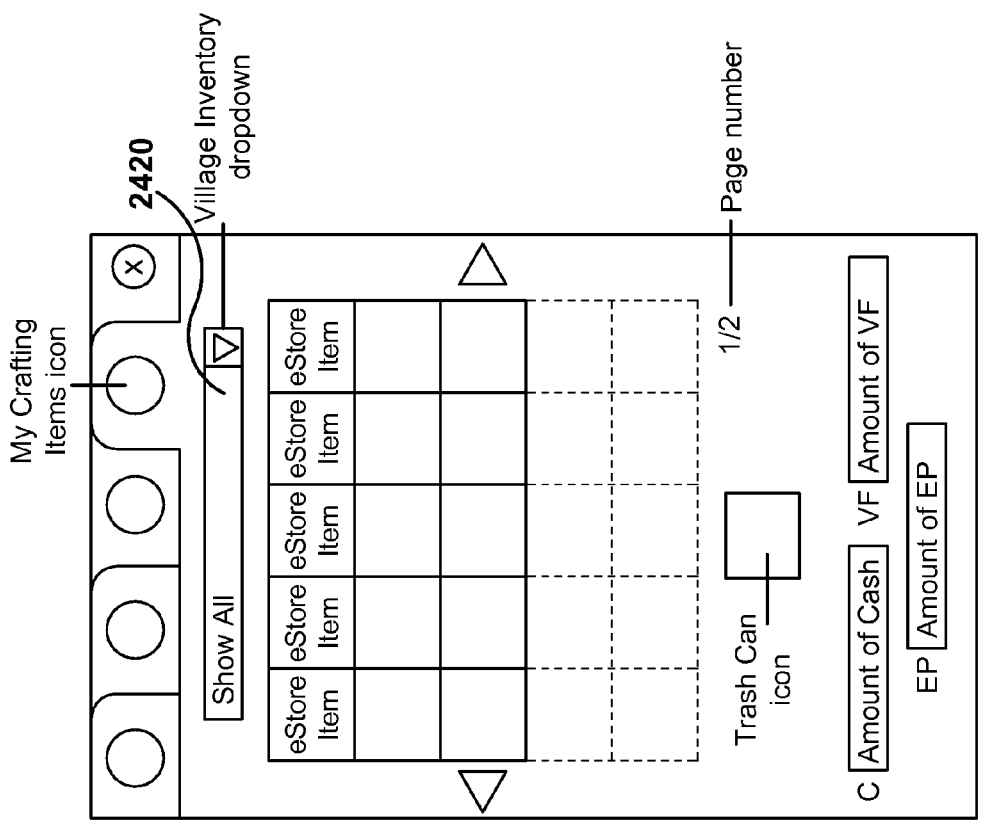

The eStore Items screen shown in FIG. 25 is a special section of the inventory that holds any eStore items that the user has purchased. An "eStore item" is defined as any item that we have specifically designed to be purchased at the Ganz eStore in exchange for eStore points. It does not include any items that originate from within the game world and are then sold by one user to another through the eStore (namely, crafted items).

Note that any village items (structures, building upgrades, village improvements, etc.) that are sold by Ganz through the eStore will go into the eStore inventory, rather than the village inventory.

The eStore inventory will function similarly to the village inventory, in that it will have unlimited storage space divided into pages of 25 slots. All of the pagination rules described in 2.2 also apply to the eStore inventory.

Just like the village items screen, the eStore Items screen has a dropdown menu that allows the user to filter the items that are displayed. It will function like the village inventory dropdown, and it will contain the following options, in this order:

Show All (selected by default)
Furniture
Indoor Decorations
Clothing
Food
Village Items
Other Items "Other Items" area is a catch-all option that displays any item that has been tagged in a way that does not fit into any of the previous 4 categories. There are certain functions that are shared across all four inventory screens. All of these functions are described below.

Every item will have a special item card which will contain detailed information aboutthe item. The item card will become visible when the player rolls over an icon in their inventory. The card is dynamically sized based on the amount of content displayed. For example, one item card is shown as 1500 in FIG. 15.

Instead of each item always staying in the specific slot where the user placed it, the system automatically reorganizes all four inventories—backpack, crafting, village, and eStore—to display items as efficiently as possible. This reorganization will take place whenever the user closes the inventory; so the next time the user reopens it, the items will appear in their new positions. Also, the basic order of the items should remain the same as the user specified, but any empty slots between them should be eliminated.

Figure 27:
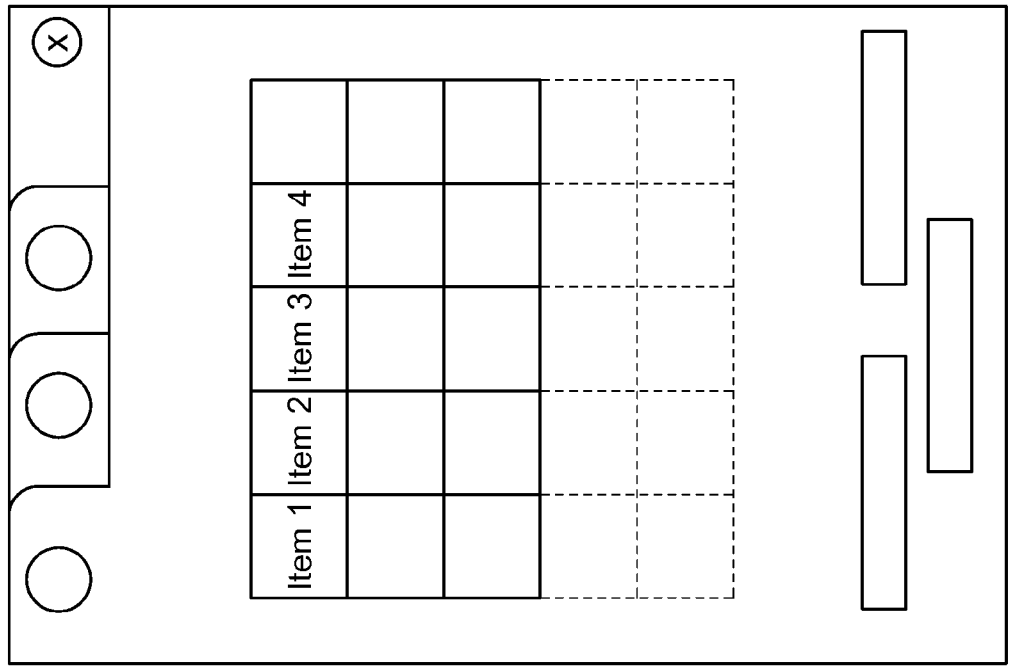
FIGS. 26-27 show item reorganization.

Consider the following example. The user arranges four items in their Backpack as in FIG. 26. The user then closes the inventory. The next time the user opens the backpack interface, the interface looks like FIG. 27, showing the items condensed into closest spots.

This rule also applies to the village and eStore Item screens. In each case, the system will need to take the multiple inventory pages into account. For instance, if the user has a total of 30 items in her village inventory, there are 2 pages, with 25 items on the first and 5 items on the second. Should the user then remove 5 items from the first page and close the interface, the next time the user accesses her village inventory the user will see only a single page with 25 items on it; in other words, the 5 items on the second page will have shifted into the newly available slots on the first.

Figure 26:
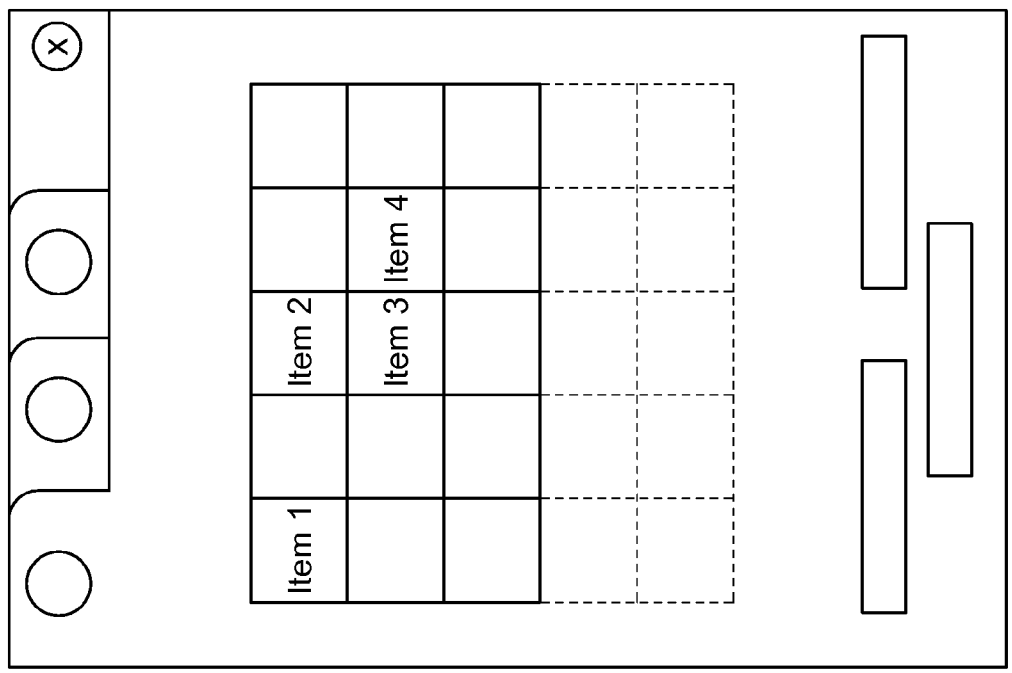

The users are able to drag and drop 2D item icons back and forth from her inventory to a variety of other interfaces—storage, trading, village vendors, etc, as shown in FIG. 28. The users are also able to drag and drop the icons from one inventory slot to another in order to arrange them. However, as shown in FIGS. 26-27, any arrangements made are subject to reorganization by the system.

When the user clicks on an item 2800, the main item icon is grayed out, and a ghosted version of it will appear attached to the cursor, shown as 2810. If the user then moves the icon over a slot 2820 that it can be placed in, a green border will appear around the slot. On the other hand, if the user moves the icon over a slot where it cannot be placed, the slot will have a red border. So if the user moves a village item over a backpack slot it is outlined in red; likewise if the user moves a non-village item into the village inventory, or an eStore item into her Backpack, and so on. Note that this only applies to empty slots: if the user drags an icon over a slot that is already filled with an item, then there is no feedback.

Should the user select a slot where the item cannot be placed—i.e. a red-bordered slot or a filled slot—the icon will disappear from her cursor and the item will remain where it was, with the main icon now in full color again, rather than grayed out. If the user drops it into a valid slot, the main icon will now appear inside of that slot, automatically snapped to the center.

If the user has the inventory interface open and the user is using their mouse to drag a 2D icon of an item, the user can drag the icon out of the inventory to place the item in the world. In this case, the 2D icon will immediately become the corresponding 3D object as soon as the user's cursor leaves the inventory interface. The user can then place this object in the 3D environment Note that the user will not be able to move objects into the world if the user has an additional interface, such as storage or trading, open alongside their inventory. In this case, the dragged item remains as a 2D icon, to facilitate moving things back and forth between the two interfaces. Also, there are some items—emote consumables and crafting materials, for example—that do not have a 3D object associated with them. These items will show only a 2D icon while they are being dragged.

If the object can be picked up and placed in the user's inventory, the Gather button appears in the Interaction Choices menu. Clicking this button will place the item in the user's inventory (item becomes semi-transparent and quickly moves to the backpack icon). If the player is not standing adjacent to the object, it will immediately run to it and place it into their inventory.

Once an item has been "gathered" from the world, the system should automatically place it in the next available slot in the user's inventory. Also, the system will need to send the item to the correct inventory; for example, if the user clicked "Gather" on an eStore item, the user would be able to see it on their eStore Items screen. If the user attempts to "Gather" an item that goes in their backpack, but all of the slots are currently full, an error message is displayed.

Since the user has a limited amount of storage space, there is trash can icon, such as 2230 on each inventory screen, allowing the user to delete an item to make room for another. If the user has an item attached to their cursor and clicks on the trash can, a system message is displayed, asking whether or not the user wants to delete it. If the user confirms, the item is destroyed and the inventory slot that it previous occupied is emptied. If the user cancels, the item returns to its slot.

Note that the trash can icon is only active on the backpack, crafting item, and village item screens. It is grayed out on the eStore Items screen, since eStore items cannot be destroyed.

Certain items are groupable, meaning that multiples of that item type take up only a single slot in the user's inventory. Each item type will have a grouping limit: 20 apples can be grouped together, as opposed to a group of chairs limited to 5, for example.

The system automatically groups items up to their stated maximum. So if the user picks up an apple, but already has one in their inventory, a group of 2 is created. Also, the user can drop one group of items onto another group of the same type to combine them—for instance, if the user drops a group of 5 apples onto an existing group of 10, a single group of 15 is created.

However, if the combined group goes beyond the maximum—i.e. the user drops 5 apples onto an existing 19—the target group is raised to the maximum (in this case 20) and the remaining items are still attached to the user's cursor (in this case, 4 apples).

FIG. 29 shows the screen operating for handling grouped items.

There are various items in Tail Towns™ that are classified as "Storage": fridges, wardrobes, toy boxes, etc. All of these items are 3D objects that can be placed in the user's house. When the user clicks on the storage object, a popup 2D interface is launched.

Figure 30:
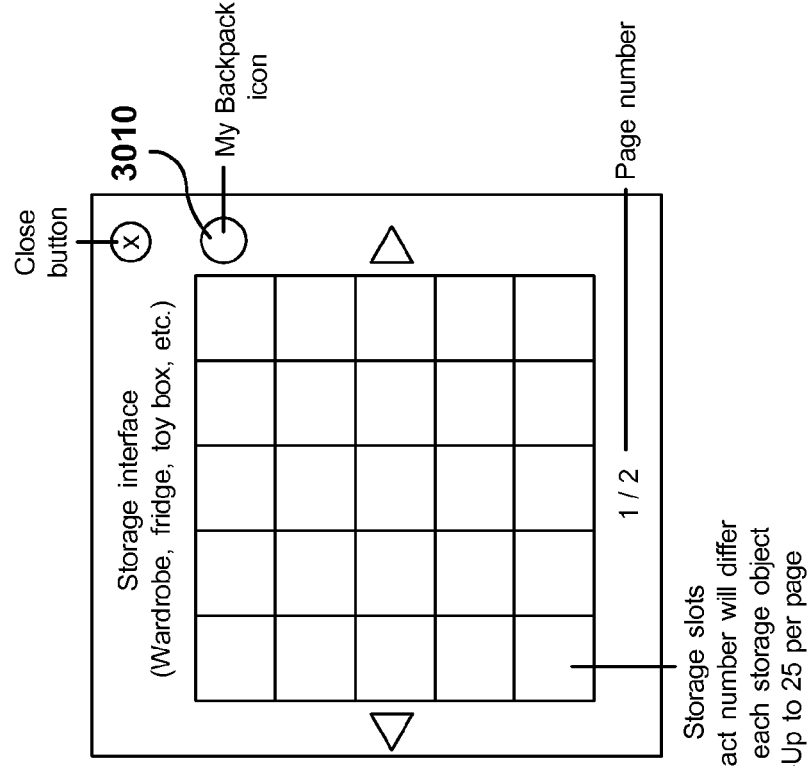
Figure 32:
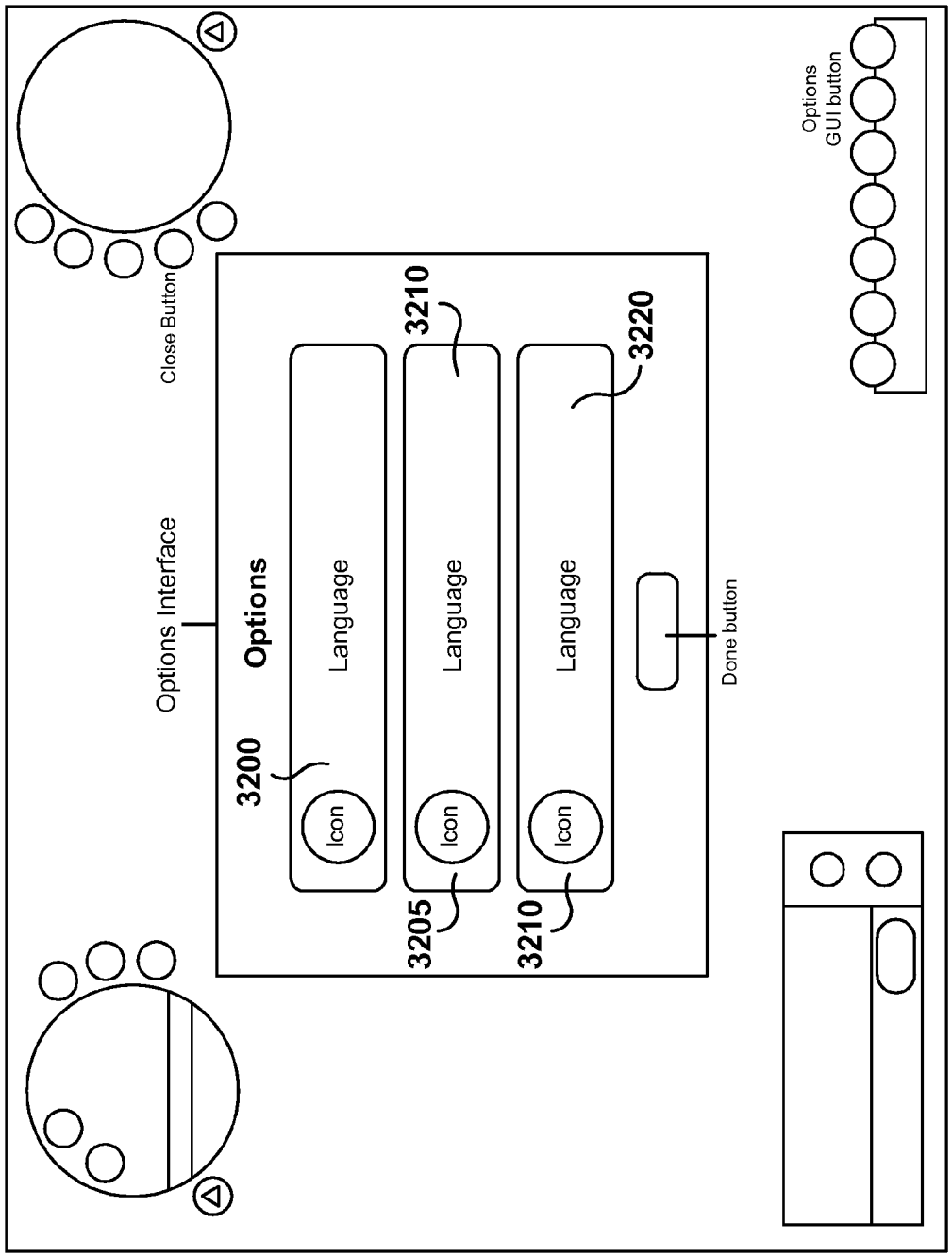
FIG. 32 shows the options interface for the virtual world.

The interface for each storage object is based off the same system as shown in FIG. 30. However, the interfaces will be skinned differently, so that a fridge interface won't look like a wardrobe interface. Essentially, each storage object will work as a separate inventory space, with the number of slots available dependent on the object itself. For example, a standard fridge might have 15 spaces, while a high-end fridge could have 25.

Each storage object will limit the type of items that can be placed within it. In other words, a fridge will only accept items that have been tagged as "Food," while a wardrobe will only accept items that have been tagged as "Clothing." Apart from this stipulation, the storage interface will function in largely the same manner as the inventory interface. Here is a list of functions that will the storage interface will share with the inventory:

Pagination—storage objects can potentially have multiple pages of storage, just like the village and eStore Item screens. There should be 25 storage slots on each page, and the user are able to browse through pages in the same way.

Space upgrades—as with the backpack, the user can purchase more slots for specific storage objects. In general, upgrades are sold a page at a time and paid for with in-game cash.

Every storage interface will have a button 3010 that looks like the icon on the My Backpack tab. Clicking this button will launch the inventory interface, with the backpack screen automatically selected. The storage interface should always be on the left, and the user's inventory on the right.

The user can then drag and drop item icons from a slot in their inventory to a slot in the storage interface, or vice versa. The rules outlined above still apply—so if the user drags an item to an empty slot where it cannot be placed, the slot will have a red border. For example, if the user drags a "clothing" item to a slot on the fridge interface, it would be outlined red. If the user drags an item to a slot where it can be placed, the slot will have a green border.

Note that the users are able to close each interface independently. This means that the user could close the storage interface and still be viewing their inventory, or close their inventory and still be viewing the storage interface.

If the user is moving a grouped item from one interface to another, a small contextual interface will launch as soon as the user places the item in a slot. FIG. 30 shows the interface 2900. The user then uses the arrow buttons to specify how many of that item the user wants to move. The minimum is 1; the maximum is however many items are currently in the group the user is moving. Once the user clicks "OK," the interface is closed, and the selected number of items are moved, with the remainder staying in their previous slot.

Most storage objects hold Backpack items only. However, there are certain objects that hold only crafting components; items from the backpack and crafting item screens never go into the same storage. There will not need to be storage for village items, as that inventory screen is unlimited.

Items from the eStore inventory screen can be placed into the same storage objects as backpack items, based on their item type: for example, an eStore food can go in the fridge. If the user then wants to move the item back into their inventory, the user can select the eStore tab to switch to that screen, at which point the user can drag the item into their inventory as usual.

Figure 31:
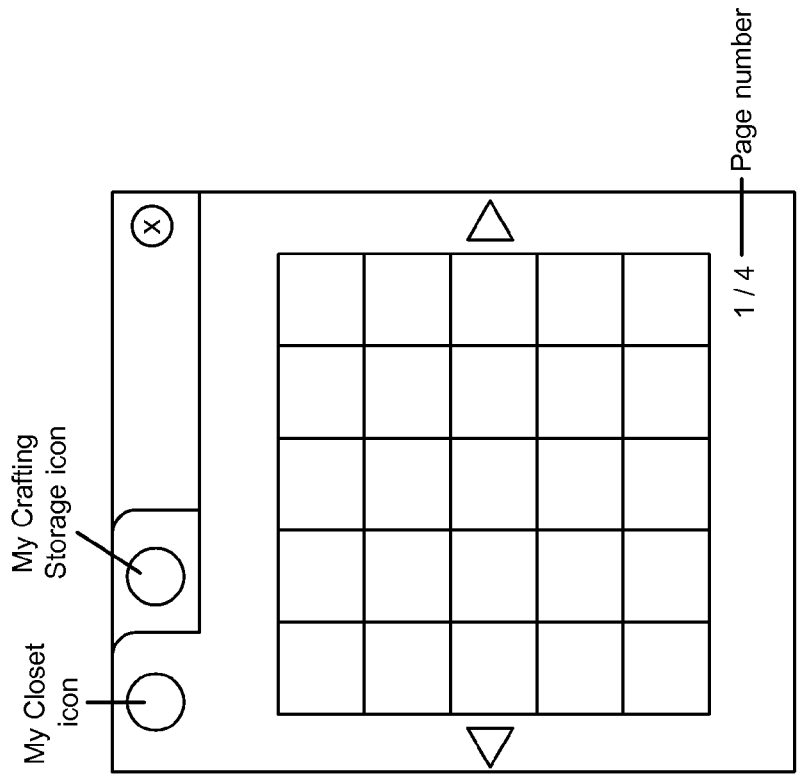
FIG. 31 shows the closet interface.

A closet storage as shown in FIG. 31 is also used for the user to use a place to regularly store items that the user doesn't know what to do with immediately, allowing their to free up space in the backpack tab of their inventory. To accommodate this, every villager house and Starter Town apartment will come with a closet.

The closet is essentially a storage object with an unlimited capacity. It appears in the 3D environment as a door in the wall; each Villager's house will have a closet door. However, the user will only have a single closet space—so no matter which house the user accesses the closet from, the user is looking at the same information (as opposed to a fridge, where each fridge object is a unique container).

Other differences between the closet and standard storage objects:

The closet will accept almost every type of item, with "Food" being the one exception.

The closet has two tabs: "My Closet" and "My Crafting Storage." These are just like the analogous tabs on the inventory interface, with the first tab accepting Backpack items and the second accepting crafting components. Both tabs have unlimited storage slots, divided into pages of 25.

The user is able to send items that the user has placed in the 3D environment directly to their closet. This will function similarly to the "Gather" button described above. Any item that can be placed in the closet will have an additional "Store" option. When the user clicks this option, the system will automatically send the item to the first available closet slot.

FIG. 2 shows the operations interface 240. The user is able to access the Options interface 241 from a button on the main GUI. The user can then use this interface to modify a variety of different settings, divided into 3 main categories Display at 3200. This screen will let the user adjust the quality of their graphics, as well as turn certain graphic elements on or off Sound at 3210—on this screen, the user can adjust the volume of the site's music, dialogue, and sound effects.

Language at 3220—this screen will allow the user to change their current language setting, as well as choose whether or not to be shown Villages from other languages.

Each of the above show user interfaces that created on a client computer based on commands and or programming on a client computer. The operation can also be hosted on a server computer. The server computer can send the program for downloading, for example.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items can be shown in the central portion of the user interface, and the user interface can be used to control different kinds of things in this way.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system comprising:

A computer, providing output information in a form to be displayed on a display screen, said output information including virtual world information indicative of a virtual world with which a user can interact, and also including a radial menu for interacting with at least one virtual character in said virtual world, said computer accepting input of an element of said virtual world, said element being a selected element of said virtual world that is selected separately from other elements of said virtual world, and said radial menu having a circular portion that shows a non-static image of said selected element in a center part of the circular portion, and where said radial menu also includes a plurality of control indications radially distributed and surrounding only a portion of an outside of said circular portion of said radial menu, said plurality of control indications representing actions that are carried out to interact with said selected element in said virtual world, wherein said selected element is a location within said virtual world, and where said non-static image is of a map of at least a portion of said virtual world and said non-static image is navigable within the radial menu using one or more of the plurality of control indications.

2. A system as in claim 1, further comprising at least one display indication on said only a portion of said outside, said at least one display indication providing information about a status within said virtual world.

3. A system as in claim 2, wherein said at least one display indication represents an icon indicating whether the user has mail.

4. A system as in claim 2, wherein said display indication represent a clock for a virtual time zone within the virtual world, where said virtual time zone is the same for all players in the virtual world and where at least plural different players in the virtual world have different real time zones that are different than said virtual time zone.

5. A system as in claim 1, wherein one of said plurality of control indications sends a trade request to the another user's character.

6. A system as in claim 1, wherein said plurality of control indications relates to navigation on said map.

7. A system as in claim 1, wherein said plurality of control indications includes a travel indication, an overview map, an expanded map, zoom in and zoom out.

8. A system as in claim 7, wherein said plurality of control indications are shown with pictorial indications of their functions.

9. A system as in claim 1, wherein said map is dynamically generated and automatically changes what is shown by the map when items in the virtual world are changed by interacting with said items.

* * * * *